United States Patent
Yoshioka et al.

(10) Patent No.: US 6,873,837 B1
(45) Date of Patent: Mar. 29, 2005

(54) EMERGENCY REPORTING SYSTEM AND TERMINAL APPARATUS THEREIN

(75) Inventors: Kenji Yoshioka, Yokohama (JP); Yasutoshi Nakama, Ikoma (JP); Masashi Yamamoto, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/492,288

(22) Filed: Jan. 27, 2000

(30) Foreign Application Priority Data

Feb. 3, 1999 (JP) .......................................... 11-026656
Feb. 15, 1999 (JP) .......................................... 11-036104

(51) Int. Cl.$^7$ ................................................ H04B 1/26
(52) U.S. Cl. ........................ 455/321; 455/575; 455/421; 381/104; 381/58; 381/21.12; 381/59; 381/61; 342/357.1
(58) Field of Search ................................ 455/321, 525, 455/421, 404, 569, 352; 381/104, 58, 21.12, 59, 61, 80, 81, 123, 102; 342/352.1; 329/390.01; 340/323 R; 379/420.02

(56) References Cited

U.S. PATENT DOCUMENTS

| | | | | |
|---|---|---|---|---|
| 3,678,202 A | * | 7/1972 | Rose ............................ | 381/59 |
| 4,232,390 A | * | 11/1980 | McEvilly, Jr. ................ | 455/575 |
| 4,633,229 A | * | 12/1986 | Iacono et al. ................ | 181/144 |
| 4,683,591 A | * | 7/1987 | Dawson et al. ................ | 381/58 |
| 4,829,565 A | * | 5/1989 | Goldberg ................ | 379/390.01 |
| 5,295,192 A | * | 3/1994 | Hamada et al. .......... | 381/71.12 |
| 5,361,305 A | * | 11/1994 | Easley et al. ................ | 381/58 |
| 5,589,818 A | | 12/1996 | Queen | |
| 5,659,622 A | | 8/1997 | Ashley | |
| 5,734,315 A | * | 3/1998 | Skeen ..................... | 370/323 R |
| 5,736,962 A | * | 4/1998 | Tendler ................... | 342/357.1 |
| 5,890,061 A | * | 3/1999 | Timm et al. ................. | 455/321 |
| 5,933,080 A | | 8/1999 | Nojima | |
| 5,949,886 A | * | 9/1999 | Nevins et al. .............. | 381/104 |
| 6,188,891 B1 | * | 2/2001 | Fujiki et al. ................ | 455/421 |
| 6,275,590 B1 | * | 8/2001 | Prus ............................ | 381/61 |
| 6,356,641 B1 | * | 3/2002 | Warnaka et al. ............ | 381/190 |
| 6,359,987 B1 | * | 3/2002 | Tran et al. ..................... | 381/58 |

FOREIGN PATENT DOCUMENTS

| | | | | |
|---|---|---|---|---|
| JP | | 36104821 | * | 3/1986 |
| JP | | 362067931 A | * | 3/1987 |
| JP | | 404276900 A | * | 10/1992 |
| JP | | 5-5626 | | 1/1993 |
| JP | | 5-20578 | | 1/1993 |
| JP | | 409307988 A | * | 11/1997 |
| TW | | 170416 | | 10/1991 |

* cited by examiner

*Primary Examiner*—David Hudspeth
*Assistant Examiner*—David Q Nguyen
(74) *Attorney, Agent, or Firm*—Louis Woo

(57) ABSTRACT

An emergency reporting apparatus for a vehicle includes a microphone, a loudspeaker, and a handsfree system circuit. Handsfree two-way speech communication with an emergency report receiving center is allowed via the microphone, the loudspeaker, and the handsfree system circuit. A volume control circuit connected to the loudspeaker operates for controlling a volume level of sound generated by the loudspeaker at a predetermined constant level or higher. The volume control circuit may control the volume level at the predetermined constant level, and may inhibit a user from changing the volume level.

2 Claims, 12 Drawing Sheets

EMERGENCY REPORTING SYSTEM AND TERMINAL APPARATUS THEREIN

BACKGROUND OF THE INVENTION

1. Field of the Invention

This invention relates to an emergency reporting network system for vehicles such as automotive vehicles. This invention also relates to a terminal apparatus used in an emergency reporting network system. In addition, this invention relates to a method of reporting an emergency.

2. Description of the Related Art

A conventional emergency communication apparatus for a vehicle is started when an emergency occurs in the vehicle. After the start, the conventional apparatus tries to connect with a police station or an emergency report receiving center via a mobile telephone network. When connection has been established, the conventional apparatus allows speech communication between a user of the apparatus and an operator in the police station or the emergency report receiving center.

It is known to provide a vehicular emergency communication apparatus with a handsfree system circuit which allows handsfree speech communication between a user of the apparatus and an operator in a police station or an emergency report receiving center. In such a known apparatus, it is possible for the user to adjust the volume (the loudness) of sound generated from a loudspeaker used by the handsfree system circuit. Therefore, if the volume level is erroneously preset to a minimum, the user can not hear reproduced operator's voice during handsfree speech communication. In the known apparatus, the loudspeaker is designed for the exclusive use of the handsfree system circuit. The exclusive loudspeaker occupies a corresponding space in a related vehicle.

Japanese published unexamined patent application 5-20578 discloses a present position emergency informing device mounted on an automobile. The emergency informing device in Japanese application 5-20578 includes a crash sensor, a position detector, and an automobile telephone. When the automobile causes a crash, the crash sensor detects a related impact force. At the same time as the moment of detection of the impact force, the position detector is operated. Subsequently, an emergency section such as police is automatically contacted through the automobile telephone. Then, the accident and the position where the accident occurs are automatically notified to the emergency section.

Japanese published unexamined patent application 5-5626 discloses a navigation system which is designed so that data of emergency numbers fed from a CD-ROM, and its own position data of a vehicle estimated by means of a location device are stored in a FIFO memory. In addition, voices produced in the vehicle are stored in a voice storing device, and personal information about the driver of the vehicle and his fellow passengers is stored in an ID card device. In the navigation system of Japanese application 5-5626, the occurrence of an accident is detected by comparing a change in the signal of an acceleration sensor with a predetermined change in accident-caused impact acceleration. Upon detection of the occurrence of an accident, the information is outputted from the FIFO memory, the voice storing device, and the ID card device externally via a communication unit.

SUMMARY OF THE INVENTION

It is a first object of this invention to provide an improved emergency reporting network system.

It is a second object of this invention to provide an improved terminal apparatus in an emergency reporting network system.

It is a third object of this invention to provie an improved method of reporting an emergency.

A first aspect of this invention provides an emergency reporting apparatus for a vehicle. The emergency reporting apparatus comprises a microphone; a loudspeaker; a handsfree system circuit; means for allowing handsfree two-way speech communication with an emergency report receiving center via the microphone, the loudspeaker, and the handsfree system circuit; and a volume control circuit connected to the loudspeaker for controlling a volume level of sound generated by the loudspeaker at a predetermined constant level or higher.

A second aspect of this invention is based on the first aspect thereof, and provides an emergency reporting apparatus wherein the volume control circuit controls the volume level at the predetermined constant level, and inhibits a user from changing the volume level.

A third aspect of this invention is based on the first aspect thereof, and provides an emergency reporting apparatus wherein the volume control circuit comprises means for controlling the volume level at the predetermined constant level during emergency reporting communication, and means for allowing a user to change the volume level.

A fourth aspect of this invention is based on the first aspect thereof, and provides an emergency reporting apparatus wherein the volume control circuit comprises first means for controlling the volume level at the predetermined constant level during emergency reporting communication, second means for allowing a user to change the volume level after the first means controls the volume level at the predetermined constant level, and third means for preventing the volume level from moving out of a predetermined range after the volume level is changed via the second means.

A fifth aspect of this invention is based on the first aspect thereof, and provides an emergency reporting apparatus further comprising means for detecting a level of background sound noise inputted via the microphone, and means for controlling the volume control circuit to adjust the volume level of sound generated by the loudspeaker in response to the detected level of background sound noise.

A sixth aspect of this invention is based on the first aspect thereof, and provides an emergency reporting apparatus further comprising means for receiving a volume level control signal from the emergency report receiving center, and means for controlling the volume control circuit to adjust the volume level of sound generated by the loudspeaker in response to the received volume level control signal.

A seventh aspect of this invention is based on the first aspect thereof, and provides an emergency reporting apparatus further comprising means for receiving a volume level control signal from an external device, and means for controlling the volume control circuit to adjust the volume level of sound generated by the loudspeaker in response to the received volume level control signal.

An eighth aspect of this invention provides an emergency reporting network system comprising emergency report receiving center; a communication network; and emergency reporting apparatuses connectable with the emergency report receiving center via the communication network; wherein each of the emergency reporting apparatuses comprises the emergency reporting apparatus of one of the first to seventh aspects of this invention.

A ninth aspect of this invention provides a method of reporting an emergency in a vehicle including an audio system. The method comprises the steps of allowing handsfree speech communication with an emergency report receiving center via a microphone and a loudspeaker; and using a loudspeaker of the audio system as the handsfree speech communication loudspeaker.

A tenth aspect of this invention is based on the ninth aspect thereof, and provides a method wherein one of an audio-system loudspeakers located in a right front door, a right rear door, a left front door, a left rear door, a right portion of a rear seat, and a left portion of the rear seat of the vehicle is used as the handsfree speech communication loudspeaker.

An eleventh aspect of this invention is based on the ninth aspect thereof, and provides a method further comprising the step of, in cases where the loudspeaker of the audio system is wrong, replacing the loudspeaker of the audio system with another loudspeaker of the audio system and thereby using another loudspeaker of the audio system as the handsfree speech communication loudspeaker.

A twelfth aspect of this invention is based on the eleventh aspect thereof, and provides a method wherein the replacing step comprises the step of replacing the loudspeaker of the audio system with another loudspeaker of the audio system in response to user's manual operation.

A thirteenth aspect of this invention is based on the eleventh aspect thereof, and provides a method wherein the replacing step comprises the step of replacing the loudspeaker of the audio system with another loudspeaker of the audio system in response to a loudspeaker change requirement signal transmitted from the emergency report receiving center.

A fourteenth aspect of this invention is based on the thirteenth aspect thereof, and provides a method wherein a DTMF signal is used as the loudspeaker change requirement signal. A fifteenth aspect of this invention is based on the eleventh aspect thereof, and provides a method wherein the replacing step comprises the steps of detecting a level of sound generated by the loudspeaker of the audio system, and replacing the loudspeaker of the audio system with another loudspeaker of the audio system in response to the detected sound level.

A sixteenth aspect of this invention is based on the eleventh aspect thereof, and provides a method wherein the replacing step comprises the steps of detecting an impedance of the loudspeaker of the audio system, deciding whether the loudspeaker of the audio system is normal or wrong in response to the detected impedance of the loudspeaker, and replacing the loudspeaker of the audio system with another loudspeaker of the audio system when the loudspeaker of the audio system is decided to be wrong.

A seventeenth aspect of this invention provides an emergency reporting apparatus for a vehicle including an audio system. The emergency reporting appratus comprises a microphone; a loudspeaker; a handsfree system circuit; and means for allowing handsfree speech communication with an emergency report receiving center via the microphone, the loudspeaker, and the handsfree system circuit; wherein the handsfree speech communication loudspeaker uses a loudspeaker of the audio system.

An eighteenth aspect of this invention is based on the seventeenth aspect thereof, and provides an emergency reporting apparatus further comprising means for selecting one from among loudspeakers of the audio system as the handsfree speech communication loudspeaker.

A nineteenth aspect of this invention is based on the eighteenth aspect thereof, and provides an emergency reporting apparatus wherein the selecting means comprises a unit manually operable by a user, and means for selecting one from among loudspeakers of the audio system as the handsfree speech communication loudspeaker in response to manual operation of the unit by the user.

DESCRIPTION OF THE PREFERRED EMBODIMENTS

First Embodiment

An emergency reporting network system includes emergency reporting apparatuses which are mounted on vehicles (for example, automotive vehicles) respectively. The emergency reporting apparatuses are terminal apparatuses. The emergency reporting network system also includes a police station or an emergency report receiving center which operates as a host apparatus. The emergency reporting apparatuses can be connected with the host apparatus via a mobile telephone network.

Figure 1:
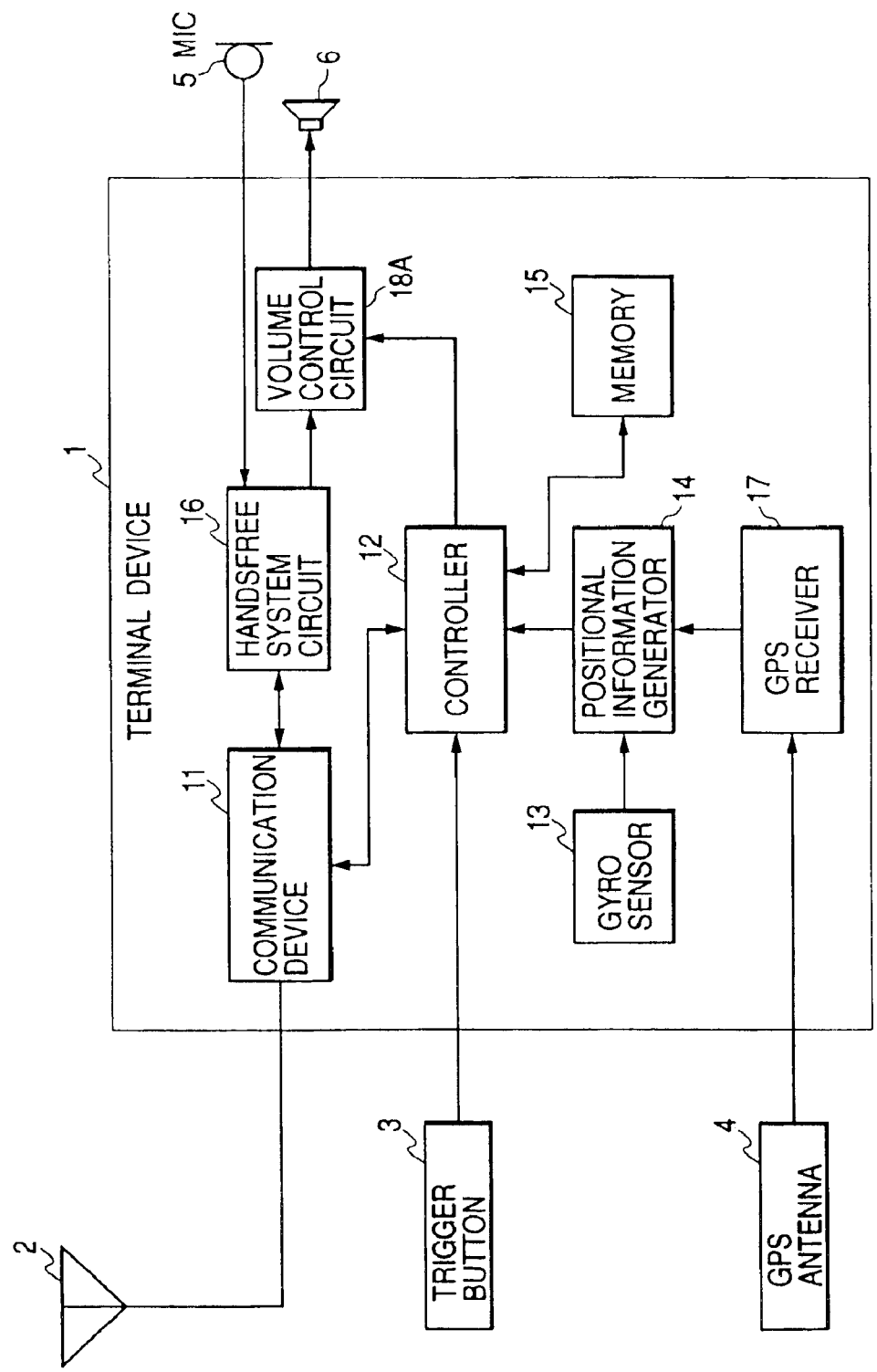
FIG. 1 is a block diagram of an emergency reporting apparatus according to a first embodiment of this invention.

FIG. 1 shows an emergency reporting apparatus (a terminal apparatus) according to a first embodiment of this invention. The emergency reporting apparatus is mounted on a vehicle such as an automotive vehicle.

As shown in FIG. 1, the emergency reporting apparatus includes a terminal device 1, a communication antenna 2, a trigger button 3, a GPS (Global Positioning System) antenna 4, a microphone 5, and a loudspeaker 6. The terminal device 1 is connected to the communication antenna 2, the trigger button 3, the GPS antenna 4, the microphone 5, and the loudspeaker 6.

The terminal device 1 includes a communication device 11, a controller 12, a gyro sensor 13, a positional information generator 14, a memory 15, a handsfree system circuit 16, a GPS receiver 17, and a volume control circuit 18A. The communication device 11 is connected to the communication antenna 2, the controller 12, and the handsfree system circuit 16. The controller 12 is connected to the trigger button 3, the positional information generator 14, the memory 15, and the volume control circuit 18A. The gyro sensor 13 is connected to the positional information generator 14. The GPS receiver 17 is connected to the GPS antenna 4 and the positional information generator 14. The handsfree system circuit 16 is connected to the microphone 5 and the volume control circuit 18A. The volume control circuit 18A is connected to the loudspeaker 6.

The trigger button 3 includes a manually-operated button which can be accessed by a user, that is, a driver or an occupant of the related vehicle. When the trigger button 3 is depressed, a trigger signal is transmitted from the trigger button 3 to the controller 12 as an emergency-occurrence indicating signal.

The GPS antenna 4 can receive GPS signals from GPS satellites. The GPS antenna 4 feeds the received GPS signals to the GPS receiver 17.

The communication device 11 includes a telephone set such as a mobile telephone set having a radio communication device which can be controlled by the controller 12. The communication device 11 can output and feed a radio signal to the communication antenna 2. The radio signal is radiated by the communication antenna 2. The radiated radio signal can propagate to a base station of a related radio telephone network. The communication antenna 2 can receive a radio signal from the base station. The received radio signal is fed from the communication antenna 2 to the communication device 11. In this way, the communication device 11 can communicate with the base station by radio on a two-way basis.

The communication device 11 can receive a call requirement signal and a destination-telephone-number signal from the controller 12. Upon the reception of the call requirement signal, the communication device 11 generates a radio signal to call the communication opposite party designated by the destination telephone number. The radio call signal contains a dial signal. The radio call signal is fed from the communication device 11 to the communication antenna 2 before being radiated thereby. The radio call signal propagates to a base station. The corresponding call signal is transmitted via the base station to the communication opposite party designated by the destination telephone number. Normally, an answer signal responsive to the call signal is transmitted from the communication opposite party to the base station. The corresponding radio answer signal is transmitted from the base station. The communication antenna 2 receives the radio answer signal. The received radio answer signal is fed from the communication antenna 2 to the communication device 11. The communication device 11 recognizes from the radio answer signal that connection with the communication opposite party is established. Then, the communication device 11 changes to a data communication mode of operation or a speech communication mode of operation. In addition, the communication device 11 informs the controller 12 that the connection with the communication opposite party is established.

The communication device 11 can receive, from the controller 12, positional information data representing the position of the related vehicle, the direction of travel of the related vehicle, and the orientation of the related vehicle. During the data communication mode of operation, the communication device 11 transmits the positional information data to the communication opposite party via the base station. The communication opposite party is, for example, a police station or an emergency report receiving center. During the speech communication mode of operation, the communication device 11 allows two-way speech communication between a user (a driver or an occupant of the related vehicle) and an operator of the communication opposite party via the base station.

The controller 12 includes a microcomputer, a CPU, or a similar device having a combination of an input/output port, a signal processing section, a RAM, and a ROM. The controller 12 operates in accordance with a program stored in the ROM.

The gyro sensor 13 generates data representing the direction of travel of the related vehicle and the orientation of the related vehicle. The gyro sensor 13 outputs the generated data to the positional information generator 14. The GPS receiver 17 generates data representative of the position of the related vehicle in response to the GPS signals fed from the GPS antenna 4. The GPS receiver 17 outputs the generated data to the positional information generator 14. The positional information generator 14 produces positional information data in response to the output data from the gyro sensor 13 and the output data from the GPS receiver 17. The produced positional information data represent the position of the related vehicle, the direction of travel of the related vehicle, and the orientation of the related vehicle. The positional information generator 14 can output the produced positional information data to the controller 12.

The memory 15 stores information representing the telephone numbers of police stations, the telephone numbers of emergency report receiving centers, the registration number of the related vehicle, and the registrant. The memory 15 can be accessed by the controller 12.

The microphone 5 can pick up voice of a user (a driver or an occupant of the related vehicle). The microphone 5 outputs an audio signal representative of the picked-up voice to the handsfree system circuit 16. The handsfree system circuit 16 can output an audio signal representative of operator's voice in the communication opposite party to the volume control circuit 18A. The volume control circuit 18A can subject the output audio signal of the handsfree system circuit 16 to volume control. The volume control circuit 18A can output the resultant audio signal to the loudspeaker 6. The volume control circuit 18A is controlled by the controller 12. The loudspeaker 6 converts the output audio signal of the volume control circuit 18A into corresponding sound which can be heard by the user. The handsfree system circuit 16 can transmit and receive voice information to and from the communication device 11.

The handsfree system circuit 16 cooperates with the microphone 5, the loudspeaker 6, the communication device 11, and the volume control circuit 18A, thereby allowing handsfree two-way speech communication between a user (a driver or an occupant of the related vehicle) and an operator of the communication opposite party. The handsfree system circuit 16 has an echo cancel function and an anti-howling function. The volume control circuit 18A operates to make constant the output level at the loudspeaker 6 over a wide level range of an input signal. In other words, the volume control circuit 18A acts to hold the loudspeaker output sound level at a constant level. The constant level may be equal to or higher than a predetermined level. The volume control circuit 18A includes, for example, an AGC (automatic gain control) circuit.

The emergency reporting apparatus in FIG. 1 operates as follows. In the event of an emergency such as an accident or a sudden illness, the trigger button 3 can be depressed by a user (a driver or an occupant of the related vehicle). The depression of the trigger button 3 sends an emergency-occurrence indicating signal to the controller 12. The controller 12 recognizes from the emergency-occurrence indicating signal that an emergency occurs and the emergency should be reported. Then, the controller 12 starts a process of reporting an emergency.

During the emergency reporting process, the controller 12 outputs a signal to the positional information generator 14 which requires current positional information (information related to the current position of the related vehicle). In response to the output signal from the controller 12, the positional information generator 14 gets the current positional information. Then, the positional information generator 14 feeds the current positional information to the controller 12.

Specifically, the positional information generator 14 receives the output data from the gyro sensor 13. In addition, the positional information generator 14 receives the output data from the GPS receiver 17. The positional information generator 14 produces positional information data in response to the output data from the gyro sensor 13 and the output data from the GPS receiver 17. The produced positional information data represent the current position of the related vehicle, the current direction of travel of the related vehicle, and the current orientation of the related vehicle. The positional information generator 14 outputs the produced positional information data to the controller 12 as the current positional information.

During the emergency reporting process, the controller 12 reads out information of a destination telephone number from the memory 15. The designation telephone number is equal to the telephone number of a desired communication opposite party (a police station or an emergency report receiving center). The controller 12 feeds the information of the destination telephone number to the communication device 11. The controller 12 requires the communication device 11 to generate a radio signal to call the communication opposite party designated by the destination telephone number. Accordingly, the communication device 11 generates the radio call signal. The radio call signal contains a dial signal. The radio call signal is fed from the communication device 11 to the communication antenna 2 before being radiated thereby. The radio call signal propagates to a base station. The corresponding call signal is transmitted via the base station to the communication opposite party designated by the destination telephone number. Normally, an answer signal responsive to the call signal is transmitted from the communication opposite party to the base station. The corresponding radio answer signal is transmitted from the base station. The communication antenna 2 receives the radio answer signal. The received radio answer signal is fed from the communication antenna 2 to the communication device 11. The communication device 11 recognizes from the radio answer signal that connection with the communication opposite party is established. Then, the communication device 11 changes to the data communication mode of operation. In addition, the communication device 11 informs the controller 12 that the connection with the communication opposite party is established. Thus, the controller 12 decides that the connection with the communication opposite party has been successfully established.

Subsequently, the controller 12 operates to implement data communication. Specifically, the controller 12 feeds the current positional information to the communication device 11. The controller 12 requires the communication device 11 to generate a radio signal of data of the current positional information. Accordingly, the communication device 11 generates the radio data signal. The radio data signal is fed from the communication device 11 to the communication antenna 2 before being radiated thereby. The radio data signal propagates to the base station. The corresponding data signal is transmitted via the base station to the communication opposite party. In this way, the current positional information is transmitted to the communication opposite party (the police station or the emergency report receiving center) on a data communication basis. After the data communication has been completed, the controller 12 operates to allow two-way speech communication.

During the two-way speech communication, an audio signal representative of operator's voice is transmitted from the communication opposite party to the base station. The corresponding radio speech signal is transmitted from the base station. The communication antenna 2 receives the radio speech signal. The received radio speech signal is fed from the communication antenna 2 to the communication device 11. The communication device 11 recovers an audio signal (a received audio signal) from the radio speech signal. The communication device 11 is controlled by the controller 12, outputting the received audio signal to the handsfree system circuit 16. The received audio signal represents operator's voice in the communication opposite party (the police station or the emergency report receiving center). The handsfree system circuit 16 subjects the received audio signal to an echo cancel process and an anti-howling process. The handsfree system circuit 16 outputs the resultant audio signal to the volume control circuit 18A. The volume control circuit 18A is controlled by the controller 12, subjecting the output audio signal of the handsfree system circuit 16 to volume control to make the resultant audio level constant. In other words, the volume control circuit 18A processes the output audio signal of the handsfree system circuit 16 into an audio signal having a constant amplitude. The constant amplitude may be equal to or greater than a predetermined amplitude. The volume control circuit 18A outputs the resultant audio signal to the loudspeaker 6. The loudspeaker 6 converts the output audio signal of the volume control circuit 18A into corresponding sound which can be heard by the user (the driver or the occupant of the related vehicle).

During the two-way speech communication, the microphone 5 picks up voice of the user. The microphone 5 outputs an audio signal representative of the picked-up voice to the handsfree system circuit 16. The handsfree system circuit 16 subjects the audio signal to the echo cancel process and the anti-howling process. The handsfree system circuit 16 outputs the resultant audio signal (the resultant speech signal) to the communication device 11. The communication device 11 is controlled by the controller 12, generating a radio speech signal corresponding to the output audio signal from the handsfree system circuit 16. The radio speech signal is fed from the communication device 11 to the communication antenna 2 before being radiated thereby. The radio speech signal propagates to the base station. The corresponding speech signal is transmitted via the base station to the communication opposite party. Thus, two-way speech communication is implemented between the user (the driver or the occupant of the related vehicle) and the operator of the communication opposite party (the police station or the emergency report receiving center).

As previously mentioned, during the two-way speech communication, the volume control circuit 18A makes constant the output level at the loudspeaker 6 over a wide level range of an input audio signal. Preferably, the constant level at which the loudness (volume) of sound produced by the loudspeaker 6 is controlled is preset so that reproduced operator's voice can be surely heard by the user. The constant level is equal to or higher than a predetermined level.

Figure 2:
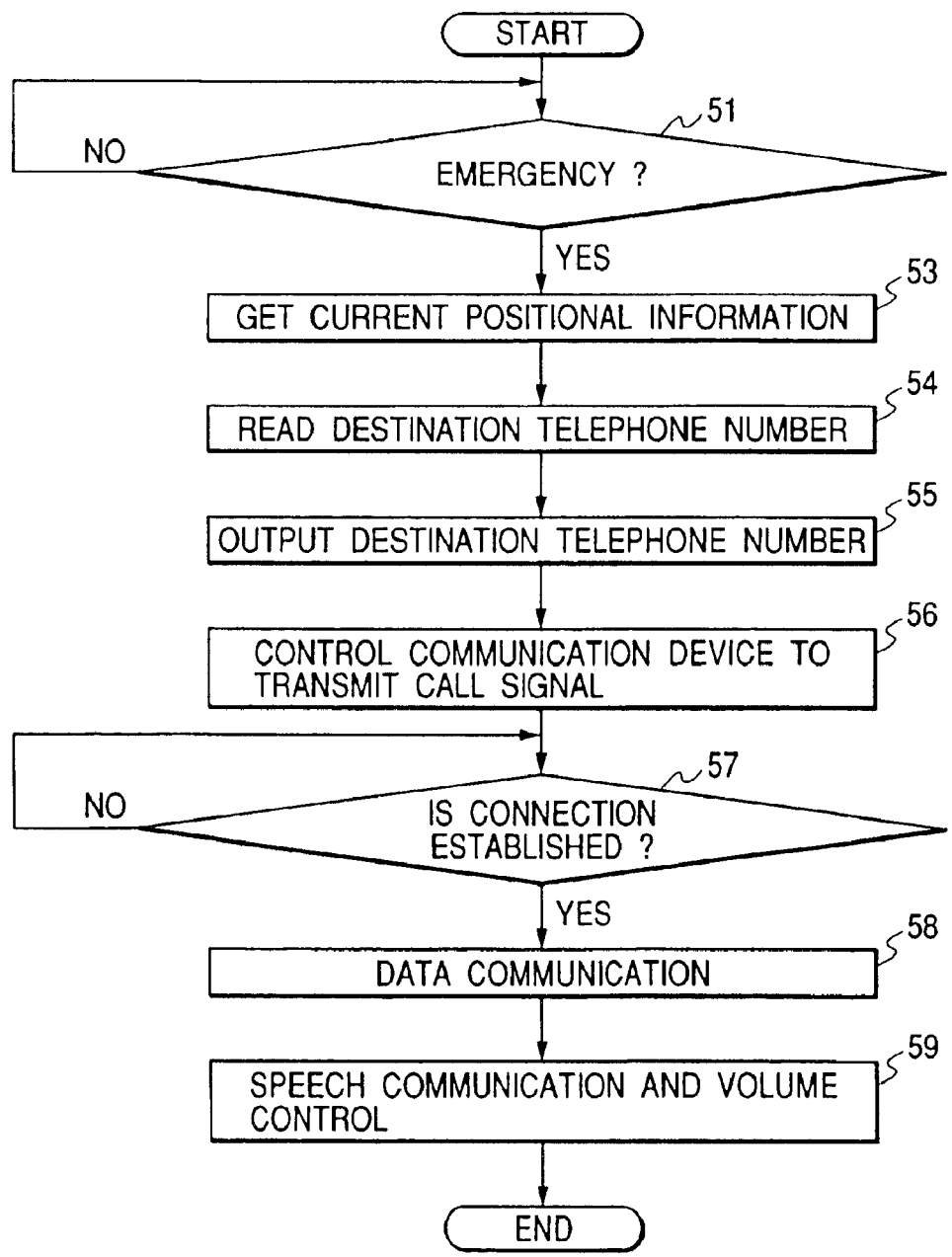
FIG. 2 is a flowchart of a segment of a program for a controller in FIG. 1.

FIG. 2 is a flowchart of a segment of the program for the controller 12. As shown in FIG. 2, a first step 51 of the program segment decides whether or not an emergency-occurrence indicating signal is received. When an emergency-occurrence indicating signal is not received, the step 51 is repeated. On the other hand, when an emergency-occurrence indicating signal is received, the program advances from the step 51 to a step 53.

The step 53 requires the positional information generator 14 to provide current positional information. Then, the step 53 receives the current positional information therefrom.

A step 54 subsequent to the step 53 reads out information of a destination telephone number from the memory 15. The designation telephone number is equal to the telephone number of a desired communication opposite party (a police station or an emergency report receiving center).

A step 55 following the step 54 informs the communication device 11 of the destination telephone number.

A step 56 subsequent to the step 55 controls the communication device 11 to generate a radio signal to call the communication opposite party designated by the destination telephone number. As previously mentioned, the radio call signal is transmitted from the communication device 11 to a base station. Then, the corresponding call signal is transmitted via the base station to the communication opposite party designated by the destination telephone number. After the step 56, the program advances to a step 57.

The step 57 decides whether or not connection with the communication opposite party has been established by referring to information fed from the communication device 11. The connection-related information is generated by the communication device 11 on the basis of an answer signal which is transmitted from the communication opposite party in response to the call signal. When connection with the communication opposite party has not yet been established, the step 57 is repeated. On the other hand, when connection with the communication opposite party has been established, the program advances from the step 57 to a step 58.

The step 158 implements data communication. Specifically, the step 58 feeds the current positional information to the communication device 11. The step 58 controls the communication device 11 to transmit the current positional information to the communication opposite party.

A step 59 following the step 58 controls the communication device 11 to allow two-way speech communication between the user (the driver or the occupant of the related vehicle) and the operator of the communication opposite party (the police station or the emergency report receiving center). In addition, the step 59 controls the volume control circuit 18A to execute the volume control on the output sound level at the loudspeaker 6. After the step 59, the current execution cycle of the program segment ends.

Second Embodiment

Figure 3:
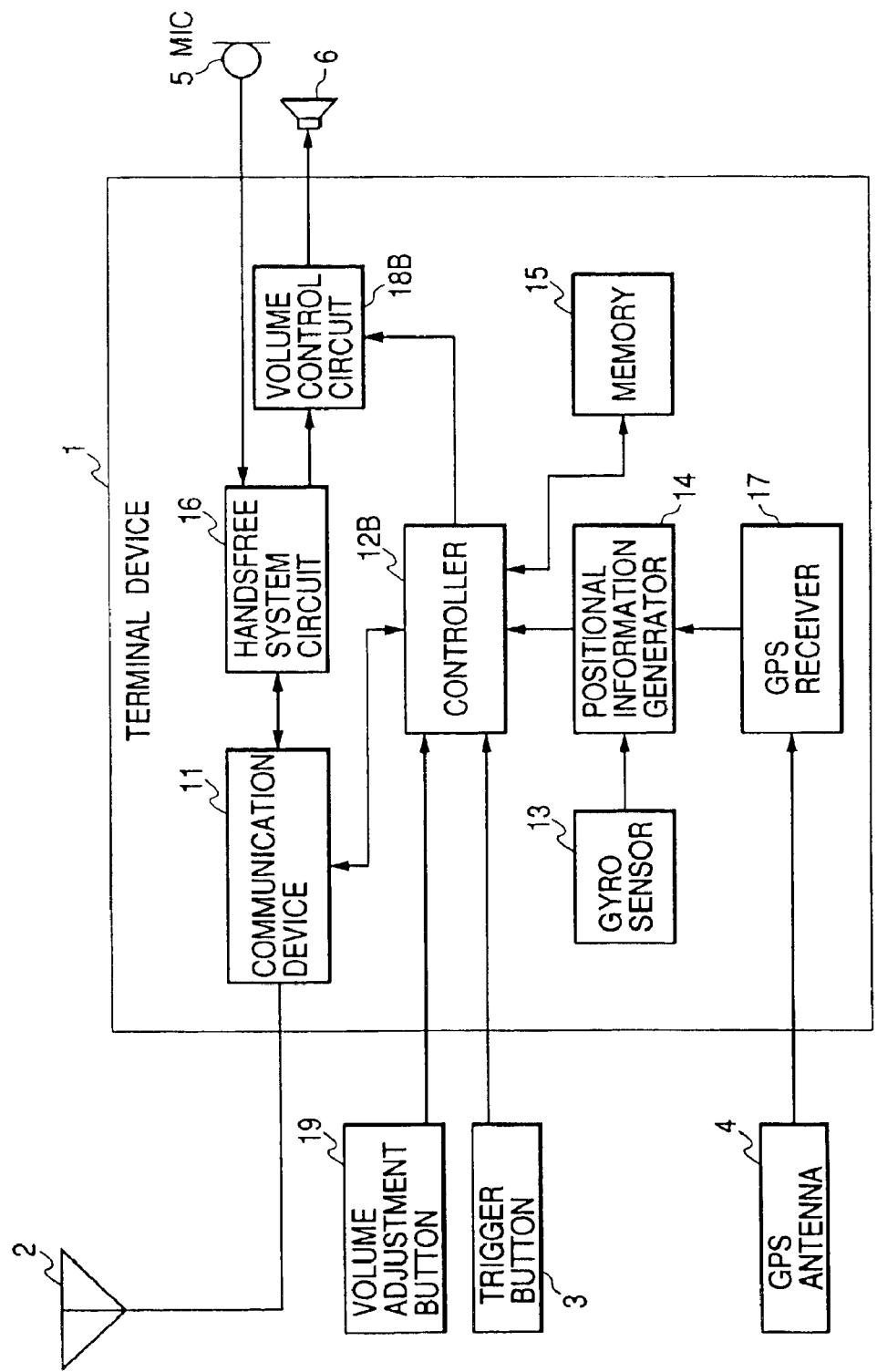
FIG. 3 is a block diagram of an emergency reporting apparatus according to a second embodiment of this invention.

FIG. 3 shows an emergency reporting apparatus (a terminal apparatus) according to a second embodiment of this invention. The emergency reporting apparatus in FIG. 3 is similar to that in FIG. 1 except for design changes mentioned hereinafter. The emergency reporting apparatus in FIG. 3 includes a controller 12B and a volume control circuit 18B which replace the controller 12 and the volume control circuit 18A (see FIG. 1) respectively. The emergency reporting apparatus in FIG. 3 futher includes a volume adjustment button 19 connected to the controller 12B. The volume adjustment button 19 may be replaced by a volume adjustment dial or a volume adjustment switch.

A desired volume (desired sound level or desired loudness) can be set by actuating the volume adjustment button 19. The volume adjustment button 19 outputs a signal representative of a desired volume to the controller 12B when being actuated. The desired volume can be changed by operating the volume adjustment button 19. The controller 12B can store the desired volume signal to a memory 15.

During operation except speech communication to report an emergency, the controller 12B adjusts the volume control circuit 18B in response to the desired volume signal to equalize an actual output sound level to the desired volume. In this case, the controller 12B receives the desired volume signal from the volume adjustment button 19 or the memory 15.

When reporting an emergency is required, the controller 12B adjusts the volume control circuit 18B to equalize an actual output sound level to a predetermined constant level regardless of the desired volume. Thereafter, the actual output sound level can be changed from the predetermined constant level by operating the volume adjustment button 19. In this case, it is possible to automatically control output sound at a suitable volume equal to the change-resultant level.

The volume control circuit 18B may be provided with a circuit for preventing an actual output sound level from being set improper as a result of volume readjustment by a user.

The controller 12B may monitor a resistance variation or a voltage variation caused by operation of the volume adjustment button 19. In this case, the controller 12B decides whether or not the monitored variation exceeds a predetermined reference variation. When the monitored variation is equal to or less than the reference variation, the controller 12B outputs a signal to the volume control circuit 18B which inhibits volume change. On the other hand, when the monitored variation exceeds the reference variation, the controller 12B outputs a signal to the volume control circuit 18B which allows volume change.

Third Embodiment

Figure 4:
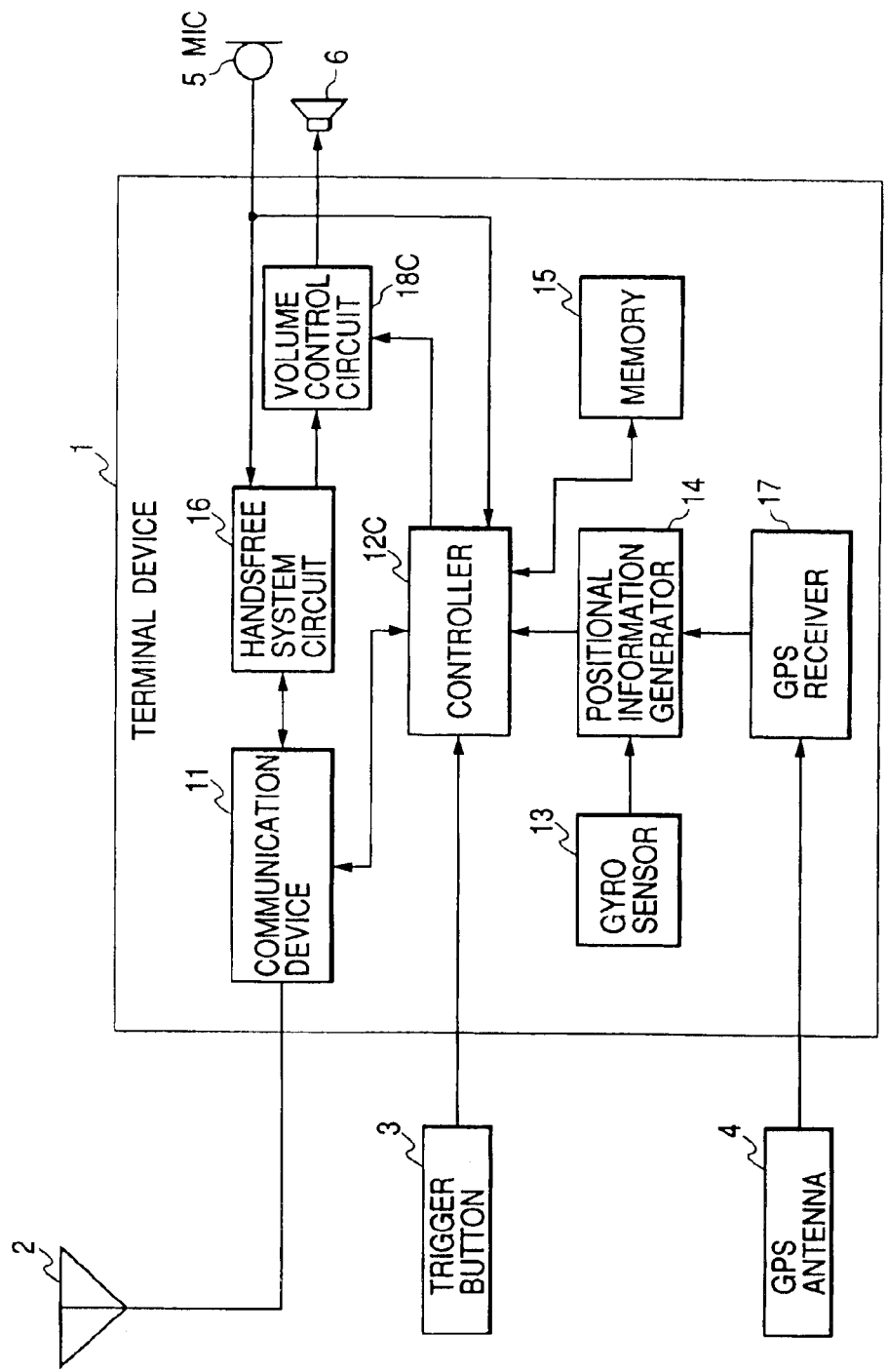
FIG. 4 is a block diagram of an emergency reporting apparatus according to a third embodiment of this invention.

FIG. 4 shows an emergency reporting apparatus (a terminal apparatus) according to a third embodiment of this invention. The emergency reporting apparatus in FIG. 4 is similar to that in FIG. 1 except for design changes mentioned hereinafter. The emergency reporting apparatus in FIG. 4 includes a controller 12C and a volume control circuit 18C which replace the controller 12 and the volume control circuit 18A (see FIG. 1) respectively. The controller 12C is connected to a microphone 5.

The microphone 5 outputs a signal having components which correspond to background sound noise interfering with a user. An input/output port of the controller 12C includes an A/D converter (analog-to-digital converter) for changing the output signal of the microphone 5 into a corresponding digital signal. The controller 12C detects a background noise level in response to the output signal of the microphone 5. The controller 12C can adjust the volume control circuit 18C to change a constant level at which the loudness of output sound is controlled by the volume control circuit 18C. Specifically, the controller 12C changes the constant level in response to the detected background noise level. In more detail, the controller 12C increases the constant level as the detected background noise level rises.

During two-way speech communication to report an emergency, when the detected background noise level is relatively great, the controller 12C operates to provide a large constant level at which the loudness of output sound is controlled by the volume control circuit 18C. Therefore, operator's voice reproduced from a loudspeaker 6 can be more surely heard by the user.

The third embodiment of this invention may also be applied to the emergency reporting apparatus in FIG. 3. In this case, during emergency reporting communication, an actual output sound level is held to a constant level which is determined in accordance with the detected background noise level, and which is independent of the desired volume. Thereafter, the actual output sound level can be changed from the previously-indicated constant level by operating a volume adjustment button. It is possible to automatically control output sound at a suitable volume equal to the change-resultant level.

Fourth Embodiment

Figure 5:
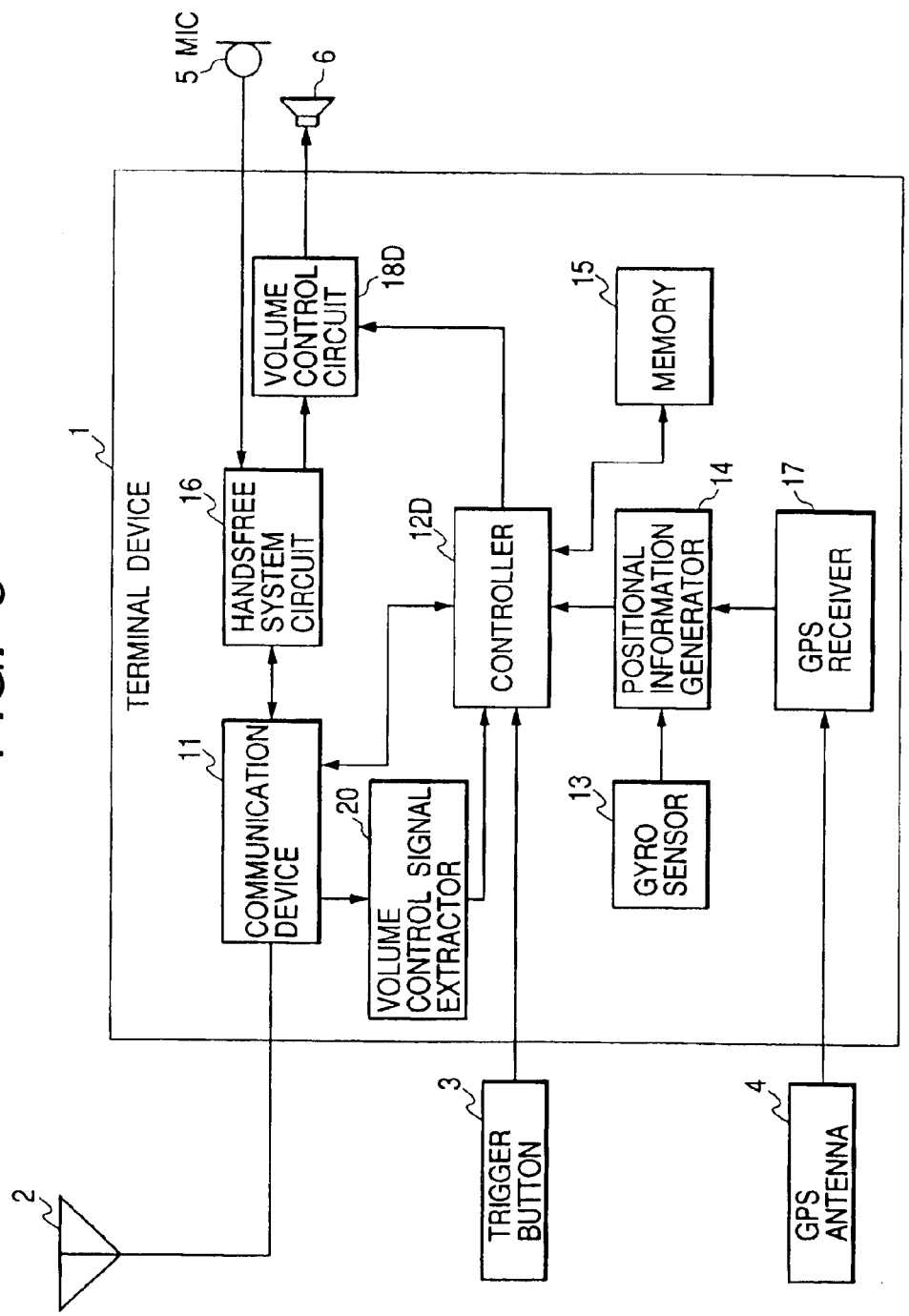
FIG. 5 is a block diagram of an emergency reporting apparatus according to a fourth embodiment of this invention.

FIG. 5 shows an emergency reporting apparatus (a terminal apparatus) according to a fourth embodiment of this invention. The emergency reporting apparatus in FIG. 5 is similar to that in FIG. 1 except for design changes mentioned hereinafter. The emergency reporting apparatus in FIG. 5 includes a controller 12D and a volume control circuit 18D which replace the controller 12 and the volume control circuit 18A (see FIG. 1) respectively. The emergency reporting apparatus in FIG. 5 futher includes a volume control signal extractor 20. The volume control signal extractor 20 is connected to a communication device 11 and the controller 12D.

During emergency reporting communication between the apparatus and an emergency report receiving center (or a police station), the center transmits a radio signal containing a volume control signal. The communication device 11 subjects a received radio signal to demodulation, and outputs a resultant baseband signal to a handsfree system circuit 16 and the volume control signal extractor 20. The device 20 extracts the volume control signal from the output signal of the communication device 11. The device 20 feeds the volume control signal to the controller 12D.

The controller 12D adjusts the volume control circuit 18D in response to the volume control signal. Thus, the controller 12D operates to adjust the loudness of sound produced by a loudspeaker 6 in response to the volume control signal. Specifically, during the emergency reporting communication, the controller 12D adjusts the loudness of produced sound at a level designated by the volume control signal. Accordingly, the emergency report receiving center (or the police station) can adjust the loudness of sound produced by the loudspeaker 6.

The fourth embodiment of this invention may also be applied to the emergency reporting apparatus in FIG. 3. In this case, during emergency reporting communication, an actual output sound level is determined by the volume control signal. Thereafter, operation of a volume adjustment button enables the actual output sound level to be changed from one determined by the volume control signal. It is possible to automatically control output sound at a suitable volume equal to the change-resultant level.

Fifth Embodiment

Figure 6:
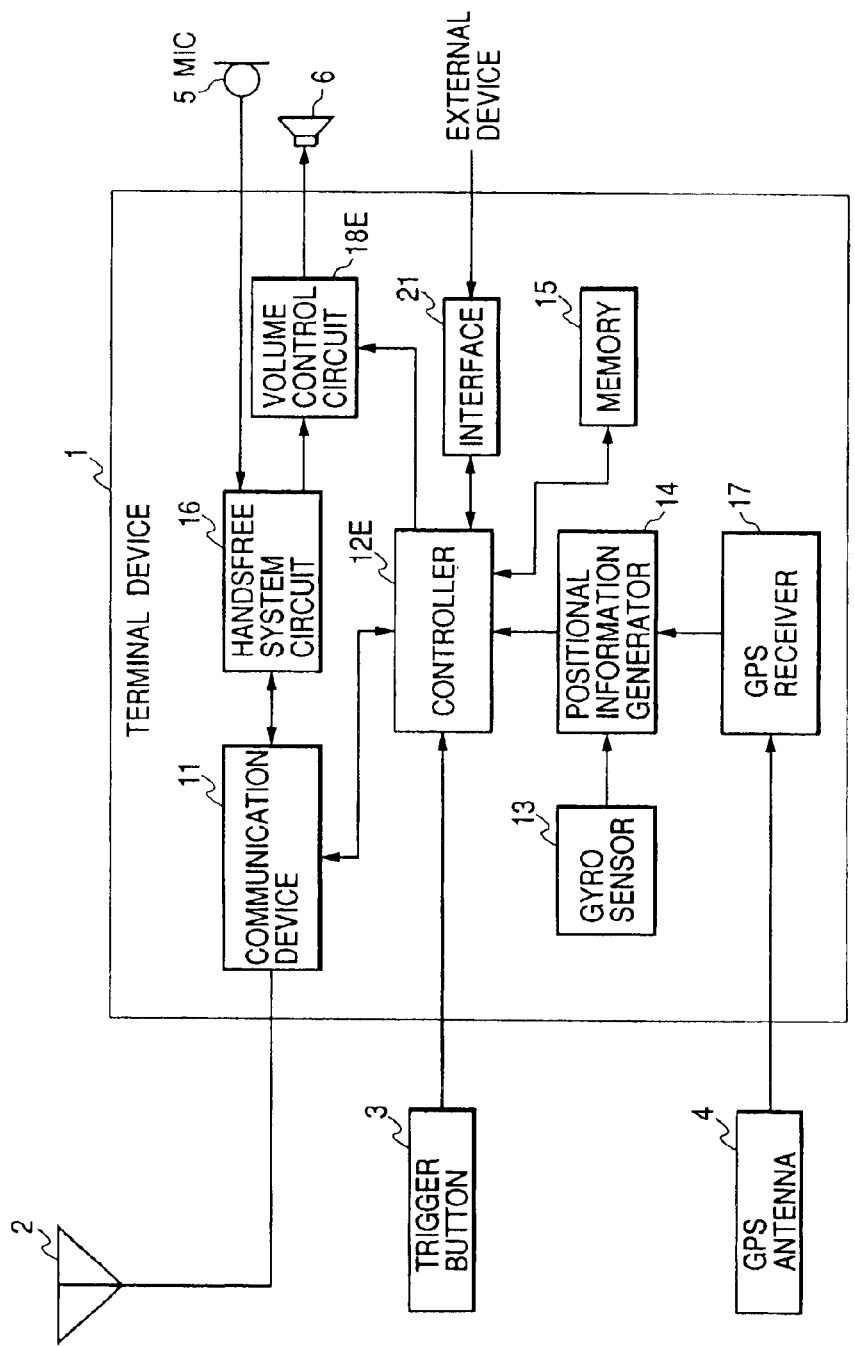
FIG. 6 is a block diagram of an emergency reporting apparatus according to a fifth embodiment of this invention.

FIG. 6 shows an emergency reporting apparatus (a terminal apparatus) according to a fifth embodiment of this invention. The emergency reporting apparatus in FIG. 6 is similar to that in FIG. 1 except for design changes mentioned hereinafter. The emergency reporting apparatus in FIG. 6 includes a controller 12E and a volume control circuit 18E which replace the controller 12 and the volume control circuit 18A (see FIG. 1) respectively. The emergency reporting apparatus in FIG. 6 futher includes an interface 21 for connection with an external device. The controller 12E is connected to the interface 21.

The external device generates a volume control signal. The volume control signal is transmitted from the external device to the controller 12E via the interface 21.

During emergency reporting communication between the apparatus and an emergency report receiving center (or a police station), the controller 12E adjusts the volume control circuit 18E in response to the volume control signal. Thus, the controller 12E operates to adjust the loudness of sound produced by a loudspeaker 6 in response to the volume control signal. Specifically, during the emergency reporting communication, the controller 12E adjusts the loudness of produced sound at a level designated by the volume control signal. Accordingly, the external device can adjust the loudness of sound produced by the loudspeaker 6.

The fifth embodiment of this invention may also be applied to the emergency reporting apparatus in FIG. 3. In this case, during emergency reporting communication, an actual output sound level is determined by the volume control signal. Thereafter, operation of a volume adjustment button enables the actual output sound level to be changed from one determined by the volume control signal. It is possible to automatically control output sound at a suitable volume equal to the change-resultant level.

The volume control signal may be contained in a communication signal transmitted from the external device. Examples of the communication signal are an asynchronous serial signal, a synchronous serial signal, a parallel signal, a LAN communication signal of an IE-BUS type or an ARC-NET type, an infrared signal, a wireless signal, and a radio signal. The synchronous serial signal uses a synchronizing signal such as a frame signal or a clock signal. The parallel signal is a bus communication signal.

Sixth Embodiment

An emergency reporting network system includes emergency reporting apparatuses which are mounted on vehicles (for example, automotive vehicles) respectively. The emergency reporting apparatuses are terminal apparatuses. The emergency reporting network system also includes a police station or an emergency report receiving center which operates as a host apparatus. The emergency reporting apparatuses can be connected with the host apparatus via a mobile telephone network.

Figure 7:
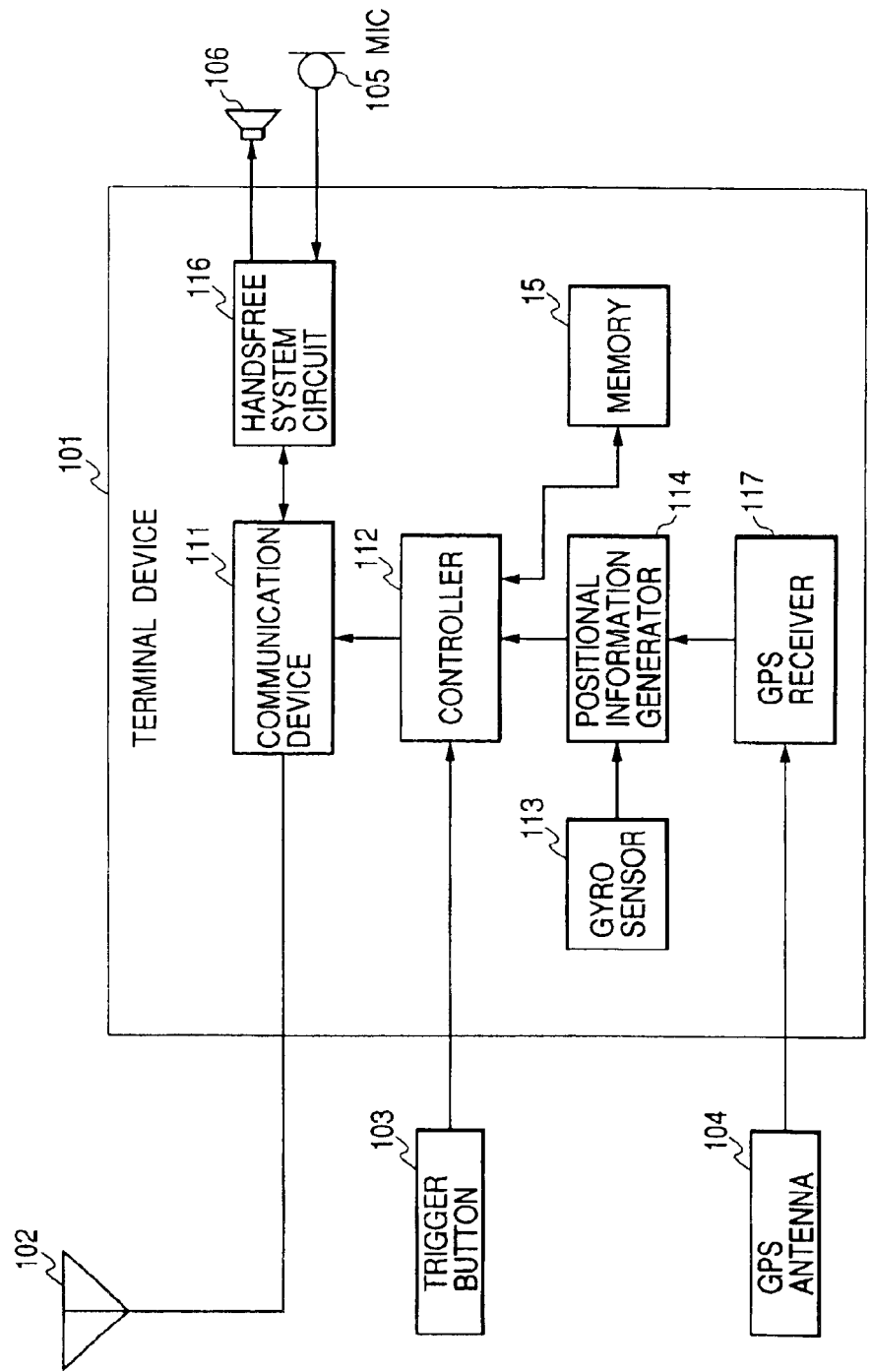
FIG. 7 is a block diagram of an emergency reporting apparatus according to a sixth embodiment of this invention.

FIG. 7 shows an emergency reporting apparatus (a terminal apparatus) according to a sixth embodiment of this invention. The emergency reporting apparatus is mounted on a vehicle such as an automotive vehicle.

As shown in FIG. 7, the emergency reporting apparatus includes a terminal device 101, a communication antenna 102, a trigger button 103, a GPS (Global Positioning System) antenna 104, a microphone 105, and a loudspeaker 106. The terminal device 101 is connected to the communication antenna 102, the trigger button 103, the GPS antenna 104, the microphone 105, and the loudspeaker 106.

The terminal device 101 includes a communication device 111, a controller 112, a gyro sensor 113, a positional information generator 114, a memory 115, a handsfree system circuit 116, and a GPS receiver 117. The communication device 111 is connected to the communication antenna 102, the controller 112, and the handsfree system circuit 116. The controller 112 is connected to the trigger button 103, the positional information generator 114, and the memory 115. The gyro sensor 113 is connected to the positional information generator 114. The GPS receiver 117 is connected to the GPS antenna 104 and the positional information generator 114. The handsfree system circuit 116 is connected to the microphone 105 and the loudspeaker 106.

The trigger button 103 includes a manually-operated button which can be accessed by a user, that is, a driver or an occupant of the related vehicle. When the trigger button 103 is depressed, a trigger signal is transmitted from the trigger button 103 to the controller 112 as an emergency-occurrence indicating signal.

The GPS antenna 104 can receive GPS signals from GPS satellites. The GPS antenna 104 feeds the received GPS signals to the GPS receiver 117.

The communication device 111 includes a telephone set such as a mobile telephone set having a radio communication device which can be controlled by the controller 112. The communication device 111 can output and feed a radio signal to the communication antenna 102. The radio signal is radiated by the communication antenna 102. The radiated radio signal can propagate to a base station of a related radio telephone network. The communication antenna 102 can receive a radio signal from the base station. The received radio signal is fed from the communication antenna 102 to the communication device 111. In this way, the communication device 111 can communicate with the base station by radio on a two-way basis.

The communication device 111 can receive a call requirement signal and a destination-telephone-number signal from the controller 112. Upon the reception of the call requirement signal, the communication device 111 generates a radio signal to call the communication opposite party designated by the destination telephone number. The radio call signal contains a dial signal. The radio call signal is fed from the communication device 111 to the communication antenna 102 before being radiated thereby. The radio call signal propagates to a base station. The corresponding call signal is transmitted via the base station to the communication opposite party designated by the destination telephone number. Normally, an answer signal responsive to the call signal is transmitted from the communication opposite party to the base station. The corresponding radio answer signal is transmitted from the base station. The communication antenna 102 receives the radio answer signal. The received radio answer signal is fed from the communication antenna 102 to the communication device 111. The communication device 111 recognizes from the radio answer signal that connection with the communication opposite party is established. Then, the communication device 111 changes to a data communication mode of operation or a speech communication mode of operation. In addition, the communication device 111 informs the controller 112 that the connection with the communication opposite party is established.

The communication device 111 can receive, from the controller 112, positional information data representing the position of the related vehicle, the direction of travel of the related vehicle, and the orientation of the related vehicle.

During the data communication mode of operation, the communication device 111 transmits the positional information data to the communication opposite party via the base station. The communication opposite party is, for example, a police station or an emergency report receiving center. During the speech communication mode of operation, the communication device 111 allows two-way speech communication between a user (a driver or an occupant of the related vehicle) and an operator of the communication opposite party via the base station.

The controller 112 includes a microcomputer, a CPU, or a similar device having a combination of an input/output port, a signal processing section, a RAM, and a ROM. The controller 112 operates in accordance with a program stored in the ROM.

The gyro sensor 113 generates data representing the direction of travel of the related vehicle and the orientation of the related vehicle. The gyro sensor 113 outputs the generated data to the positional information generator 114. The GPS receiver 117 generates data representative of the position of the related vehicle in response to the GPS signals fed from the GPS antenna 104. The GPS receiver 117 outputs the generated data to the positional information generator 114. The positional information generator 114 produces positional information data in response to the output data from the gyro sensor 113 and the output data from the GPS receiver 117. The produced positional information data represent the position of the related vehicle, the direction of travel of the related vehicle, and the orientation of the related vehicle. The positional information generator 114 can output the produced positional information data to the controller 112.

The memory 115 stores information representing the telephone numbers of police stations, the telephone numbers of emergency report receiving centers, the registration number of the related vehicle, and the registrant. The memory 115 can be accessed by the controller 112.

The microphone 105 can pick up voice of a user (a driver or an occupant of the related vehicle). The microphone 105 outputs an audio signal representative of the picked-up voice to the handsfree system circuit 116. The handsfree system circuit 116 can output an audio signal representative of operator's voice in the communication opposite party to the loudspeaker 106. The loudspeaker 106 converts the output audio signal of the handsfree system circuit 116 into corresponding sound which can be heard by the user. The handsfree system circuit 116 can transmit and receive voice information to and from the communication device 111.

The handsfree system circuit 116 cooperates with the microphone 105, the loudspeaker 106, and the communication device 111, thereby allowing handsfree two-way speech communication between a user (a driver or an occupant of the related vehicle) and an operator of the communication opposite party. The handsfree system circuit 116 has an echo cancel function and an anti-howling function.

The loudspeaker 106 uses a loudspeaker in a vehicular audio system. In other words, the emergency reporting apparatus in FIG. 7 does not have any exclusive loudspeaker which would occupy a corresponding space in the related vehicle.

The emergency reporting apparatus in FIG. 7 operates as follows. In the event of an emergency such as an accident or a sudden illness, the trigger button 103 can be depressed by a user (a driver or an occupant of the related vehicle). The depression of the trigger button 103 sends an emergency-occurrence indicating signal to the controller 112. The controller 112 recognizes from the emergency-occurrence indicating signal that an emergency occurs and the emergency should be reported. Then, the controller 112 starts a process of reporting an emergency.

During the emergency reporting process, the controller 112 outputs a signal to the positional information generator 114 which requires current positional information (information related to the current position of the related vehicle). In response to the output signal from the controller 112, the positional information generator 114 gets the current positional information. Then, the positional information generator 114 feeds the current positional information to the controller 112.

Specifically, the positional information generator 114 receives the output data from the gyro sensor 113. In addition, the positional information generator 114 receives the output data from the GPS receiver 117. The positional information generator 114 produces positional information data in response to the output data from the gyro sensor 113 and the output data from the GPS receiver 117. The produced positional information data represent the current position of the related vehicle, the current direction of travel of the related vehicle, and the current orientation of the related vehicle. The positional information generator 114 outputs the produced positional information data to the controller 112 as the current positional information.

During the emergency reporting process, the controller 112 reads out information of a destination telephone number from the memory 115. The designation telephone number is equal to the telephone number of a desired communication opposite party (a police station or an emergency report receiving center). The controller 112 feeds the information of the destination telephone number to the communication device 111. The controller 112 requires the communication device 111 to generate a radio signal to call the communication opposite party designated by the destination telephone number. Accordingly, the communication device 111 generates the radio call signal. The radio call signal contains a dial signal. The radio call signal is fed from the communication device 111 to the communication antenna 102 before being radiated thereby. The radio call signal propagates to a base station. The corresponding call signal is transmitted via the base station to the communication opposite party designated by the destination telephone number. Normally, an answer signal responsive to the call signal is transmitted from the communication opposite party to the base station. The corresponding radio answer signal is transmitted from the base station. The communication antenna 102 receives the radio answer signal. The received radio answer signal is fed from the communication antenna 102 to the communication device 111. The communication device 111 recognizes from the radio answer signal that connection with the communication opposite party is established. Then, the communication device 111 changes to the data communication mode of operation. In addition, the communication device 111 informs the controller 112 that the connection with the communication opposite party is established. Thus, the controller 112 decides that the connection with the communication opposite party has been successfully established.

Subsequently, the controller 112 operates to implement data communication. Specifically, the controller 112 feeds the current positional information to the communication device 111. The controller 112 requires the communication device 111 to generate a radio signal of data of the current positional information. Accordingly, the communication device 111 generates the radio data signal. The radio data signal is fed from the communication device 111 to the communication antenna 102 before being radiated thereby. The radio data signal propagates to the base station. The corresponding data signal is transmitted via the base station to the communication opposite party. In this way, the current positional information is transmitted to the communication opposite party (the police station or the emergency report receiving center) on a data communication basis. After the data communication has been completed, the controller 112 operates to allow two-way speech communication.

During the two-way speech communication, an audio signal representative of operator's voice is transmitted from the communication opposite party to the base station. The corresponding radio speech signal is transmitted from the base station. The communication antenna 102 receives the radio speech signal. The received radio speech signal is fed from the communication antenna 102 to the communication device 111. The communication device 111 recovers an audio signal (a received audio signal) from the radio speech signal. The communication device 111 is controlled by the controller 112, outputting the received audio signal to the handsfree system circuit 116. The received audio signal represents operator's voice in the communication opposite party (the police station or the emergency report receiving center). The handsfree system circuit 116 subjects the received audio signal to an echo cancel process and an anti-howling process. The handsfree system circuit 116 outputs the resultant audio signal to the loudspeaker 106. The loudspeaker 106 converts the output audio signal of the handsfee system circuit 116 into corresponding sound which can be heard by the user (the driver or the occupant of the related vehicle).

During the two-way speech communication, the microphone 105 picks up voice of the user. The microphone 105 outputs an audio signal representative of the picked-up voice to the handsfree system circuit 116. The handsfree system circuit 116 subjects the audio signal to the echo cancel process and the anti-howling process. The handsfree system circuit 116 outputs the resultant audio signal (the resultant speech signal) to the communication device 111. The communication device 111 is controlled by the controller 112, generating a corresponding radio speech signal. The radio speech signal is fed from the communication device 111 to the communication antenna 102 before being radiated thereby. The radio speech signal propagates to the base station. The corresponding speech signal is transmitted via the base station to the communication opposite party. Thus, two-way speech communication is implemented between the user (the driver or the occupant of the related vehicle) and the operator of the communication opposite party (the police station or the emergency report receiving center).

Figure 8:
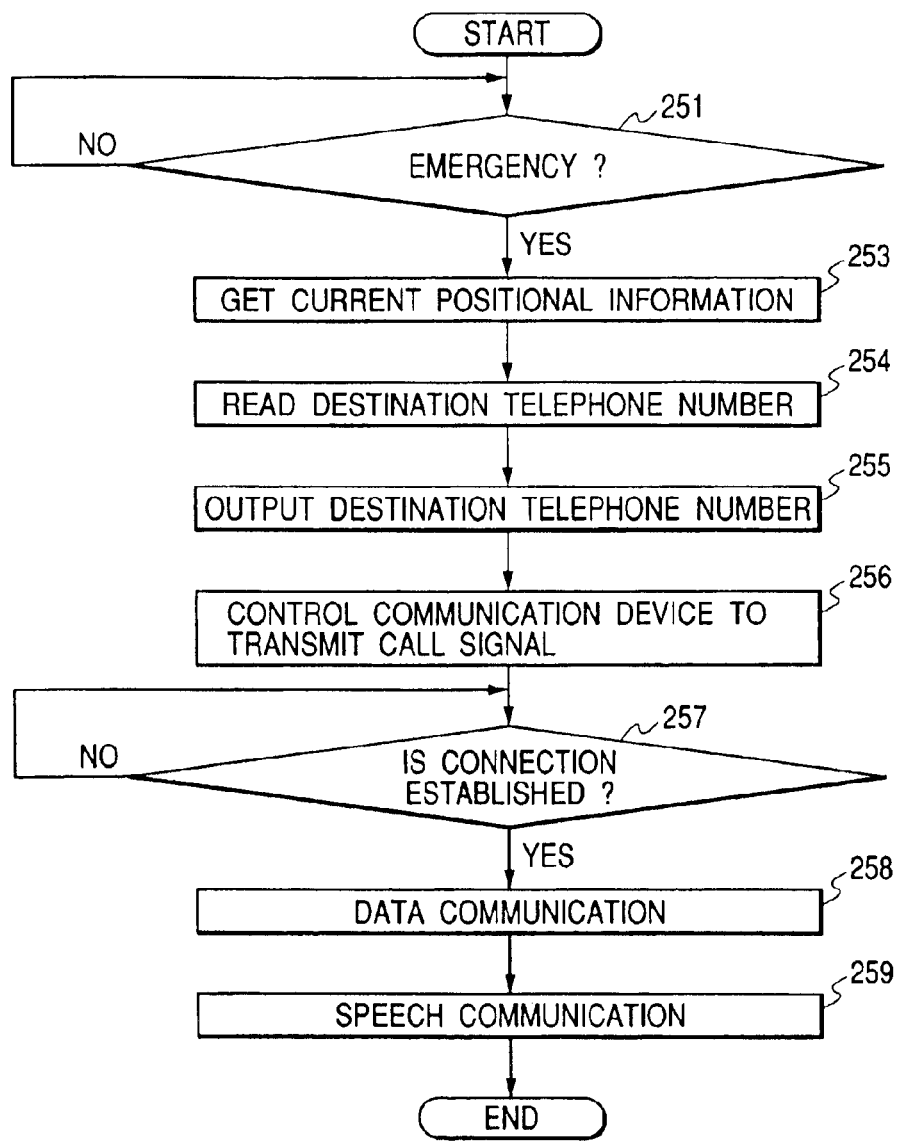
FIG. 8 is a flowchart of a segment of a program for a controller in FIG. 7.

FIG. 8 is a flowchart of a segment of the program for the controller 112. As shown in FIG. 8, a first step 251 of the program segment decides whether or not an emergency-occurrence indicating signal is received. When an emergency-occurrence indicating signal is not received, the step 251 is repeated. On the other hand, when an emergency-occurrence indicating signal is received, the program advances from the step 251 to a step 253.

The step 253 requires the positional information generator 114 to provide current positional information. Then, the step 253 receives the current positional information therefrom.

A step 254 subsequent to the step 253 reads out information of a destination telephone number from the memory 114. The designation telephone number is equal to the telephone number of a desired communication opposite party (a police station or an emergency report receiving center).

A step 255 following the step 254 informs the communication device 111 of the destination telephone number.

A step 256 subsequent to the step 255 controls the communication device 111 to generate a radio signal to call the communication opposite party designated by the destination telephone number. As previously mentioned, the radio call signal is transmitted from the communication device 111 to a base station. Then, the corresponding call signal is transmitted via the base station to the communication opposite party designated by the destination telephone number. After the step 256, the program advances to a step 257.

The step 257 decides whether or not connection with the communication opposite party has been established by referring to information fed from the communication device 111. The connection-related information is generated by the communication device 111 on the basis of an answer signal which is transmitted from the communication opposite party in response to the call signal. When connection with the communication opposite party has not yet been established, the step 257 is repeated. On the other hand, when connection with the communication opposite party has been established, the program advances from the step 257 to a step 258.

The step 258 implements data communication. Specifically, the step 258 feeds the current positional information to the communication device 111. The step 258 controls the communication device 111 to transmit the current positional information to the communication opposite party.

A step 259 following the step 258 controls the communication device 111 to allow two-way speech communication between the user (the driver or the occupant of the related vehicle) and the operator of the communication opposite party (the police station or the emergency report receiving center). After the step 259, the current execution cycle of the program segment ends.

Figure 9:
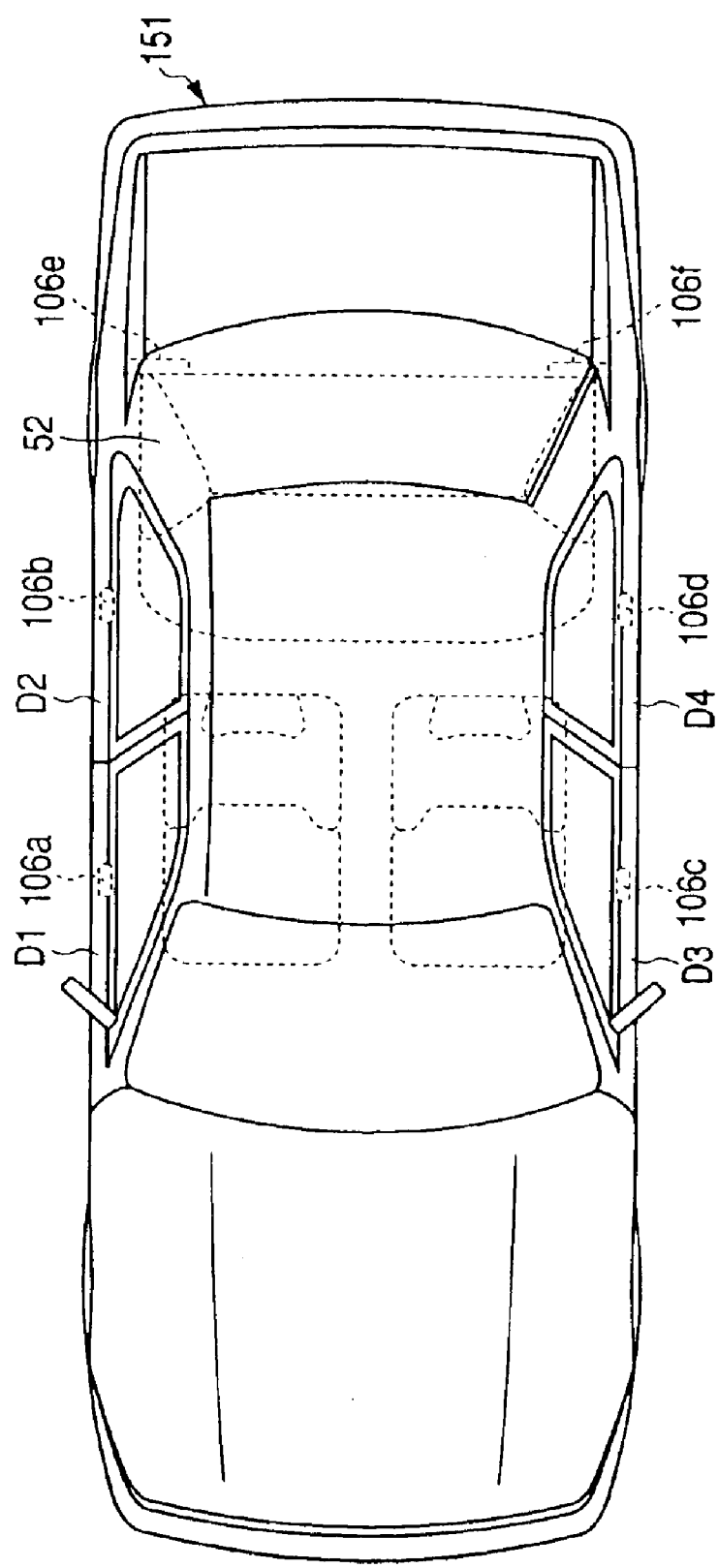
FIG. 9 is a top view of an automotive vehicle on which the emergency reporting apparatus in FIG. 7 is mounted.

FIG. 9 shows an automotive vehicle 151 on which the emergency reporting apparatus of FIG. 7 is mounted. As shown in FIG. 9, the automotive vehicle 151 has a right front door D1, a right rear door D2, a left front door D3, and a left rear door D4. The automotive vehicle 151 also has a rear seat 152. The automotive vehicle 151 is equipped with a vehicular audio system having loudspeakers 106a, 106b, 106c, 106d, 106e, and 106f. The loudspeakers 106a, 106b, 106c, and 106d are located in the doors D1, D2, D3, and D4 respectively. The loudspeakers 106e and 106f are located in right and left portions of the rear seat 152, respectively. The loudspeaker 106 in FIG. 7 uses one of the audio-system loudspeakers 106a, 106b, 106c, 106d, 106e, and 106f.

Seventh Embodiment

A seventh embodiment of this invention is similar to the sixth embodiment thereof (see FIGS. 7–9) except that the loudspeaker 106 uses the audio-system loudspeaker 106a which is located in the right front door D1.

Eighth Embodiment

An eighth embodiment of this invention is similar to the sixth embodiment thereof (see FIGS. 7–9) except that the loudspeaker 106 uses the audio-system loudspeaker 106c which is located in the left front door D3.

Ninth Embodiment

A ninth embodiment of this invention is similar to the sixth embodiment thereof (see FIGS. 7–9) except that the loudspeaker 106 uses the audio-system loudspeaker 106b which is located in the right rear door D2.

Tenth Embodiment

A tenth embodiment of this invention is similar to the sixth embodiment thereof (see FIGS. 7–9) except that the loudspeaker 106 uses the audio-system loudspeaker 106d which is located in the left rear door D4.

Eleventh Embodiment

An eleventh embodiment of this invention is similar to the sixth embodiment thereof (see FIGS. 7–9) except that the loudspeaker 106 uses the audio-system loudspeaker 106e which is located in the right portion of the rear seat 152.

Twelfth Embodiment

A twelfth embodiment of this invention is similar to the sixth embodiment thereof (see FIGS. 7–9) except that the loudspeaker 106 uses the audio-system loudspeaker 106f which is located in the left portion of the rear seat 152.

Thirteenth Embodiment

Figure 10:
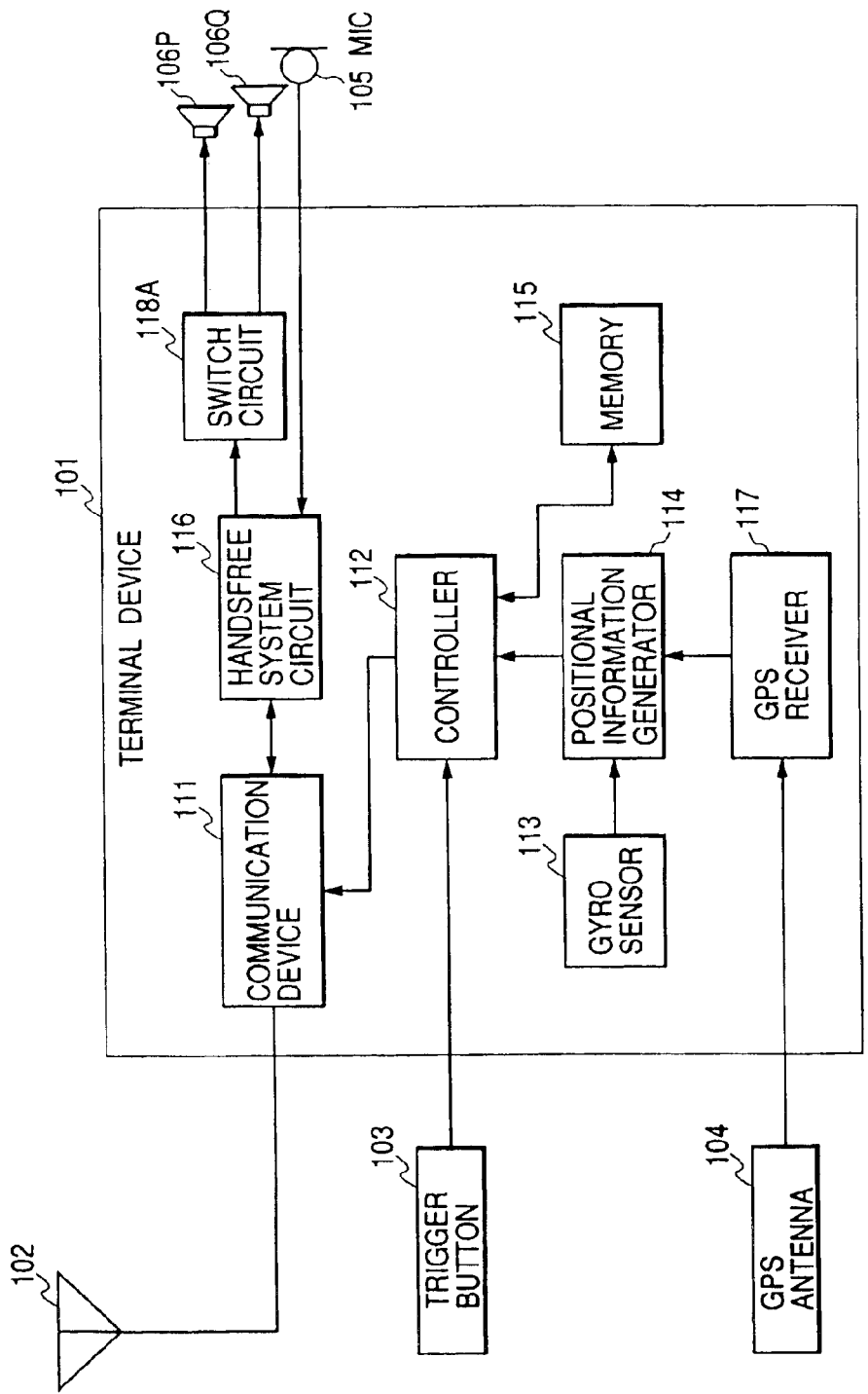
FIG. 10 is a block diagram of an emergency reporting apparatus according to a thirteenth embodiment of this invention.

FIG. 10 shows an emergency reporting apparatus (a terminal apparatus) according to a thirteenth embodiment of this invention. The emergency reporting apparatus in FIG. 10 is similar to that in FIG. 7 except for design changes mentioned hereinafter. The emergency reporting apparatus in FIG. 10 includes loudspeakers 106P and 106Q which replace the loudspeaker 106 (see FIG. 7). The loudspeakers 106P and 106Q use first one and second one of audio-system loudspeakers 106a, 106b, 106c, 106d, 106e, and 106f (see FIG. 9), respectively. The emergency reporting apparatus in FIG. 10 includes a switch circuit 118 connected to the loudspeakers 106P and 106Q and a handsfree system circuit 116.

The switch circuit 118 selects one of the loudspeakers 106P and 106Q, and transmits an audio signal from the handsfree system circuit 118 to the selected loudspeaker. The selected loudspeaker converts the audio signal into corresponding sound which can be heard by a user. The switch circuit 118 may include a manually-operated switch.

In the case where one of the loudspeakers 106P and 106Q is damaged or out of order, the switch circuit 118 is controlled to select the other loudspeaker. Accordingly, during two-way speech communication between the user of the apparatus and an operator in an emergency report receiving center (or a police station), the user can hear operator's voice reproduced from the selected loudspeaker, that is, the normal loudspeaker.

The switch circuit 118 may include a section for automatically detecting whether each of the loudspeakers 106P and 106Q is normal or wrong. In this case, when one of the loudspeakers 106P and 106Q is detected to be wrong, the switch circuit 118 selects the other loudspeaker (that is, the normal loudspeaker).

Fourteenth Embodiment

Figure 11:
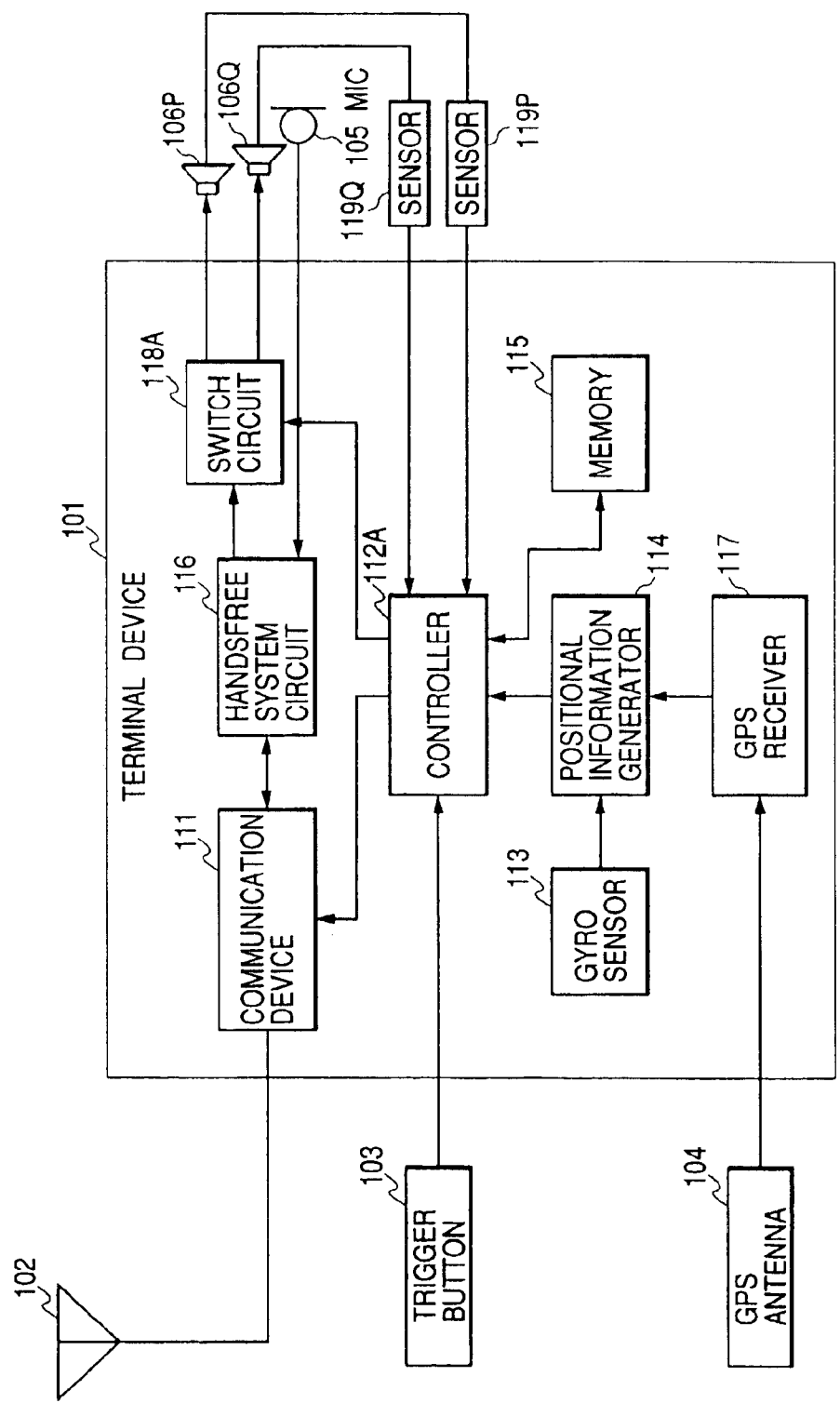
FIG. 11 is a block diagram of an emergency reporting apparatus according to a fourteenth embodiment of this invention.

FIG. 11 shows an emergency reporting apparatus (a terminal apparatus) according to a fourteenth embodiment of this invention. The emergency reporting apparatus in FIG. 11 is similar to that in FIG. 10 except for design changes mentioned hereinafter. The emergency reporting apparatus in FIG. 11 includes controller 112A and a switch circuit 118A which replace the controller 112 and the switch circuit 118 (see FIG. 10) respectively. The controller 112A is connected to the switch circuit 118A. The switch circuit 118A can be controlled by the controller 112A. The emergency reporting apparatus in FIG. 11 also includes sensors 119P and 119Q. The sensors 119P and 119Q are associated with loudspeakers 106P and 106Q respectively. The sensors 119P and 119Q are connected to the controller 112A.

The sensor 119P detects a condition of the loudspeaker 106P, for example, the input impedance of the loudspeaker 106P or the level of sound generated by the loudspeaker 106P. The sensor 119P outputs a signal to the controller 112A which represents the detected condition of the loudspeaker 106P. The sensor 119Q detects a condition of the loudspeaker 106Q, for example, the input impedance of the loudspeaker 106Q or the level of sound generated by the loudspeaker 106Q. The sensor 119Q outputs a signal to the controller 112A which represents the detected condition of the loudspeaker 106Q.

The controller 112A periodically decides whether each of the loudspeakers 106P and 106Q is normal or wrong on the basis of the output signals from the sensors 119P and 119Q. In the case where one of the loudspeakers 106P and 106Q is decided to be wrong, the controller 112A controls the switch circuit 118A to select the other loudspeaker (that is, the normal loudspeaker). Thus, in this case, the switch circuit 118A transmits an audio signal from a handsfree system circuit 116 to the normal loudspeaker so that a user can hear operator's voice reproduced from the normal loudspeaker.

Fifteenth Embodiment

Figure 12:
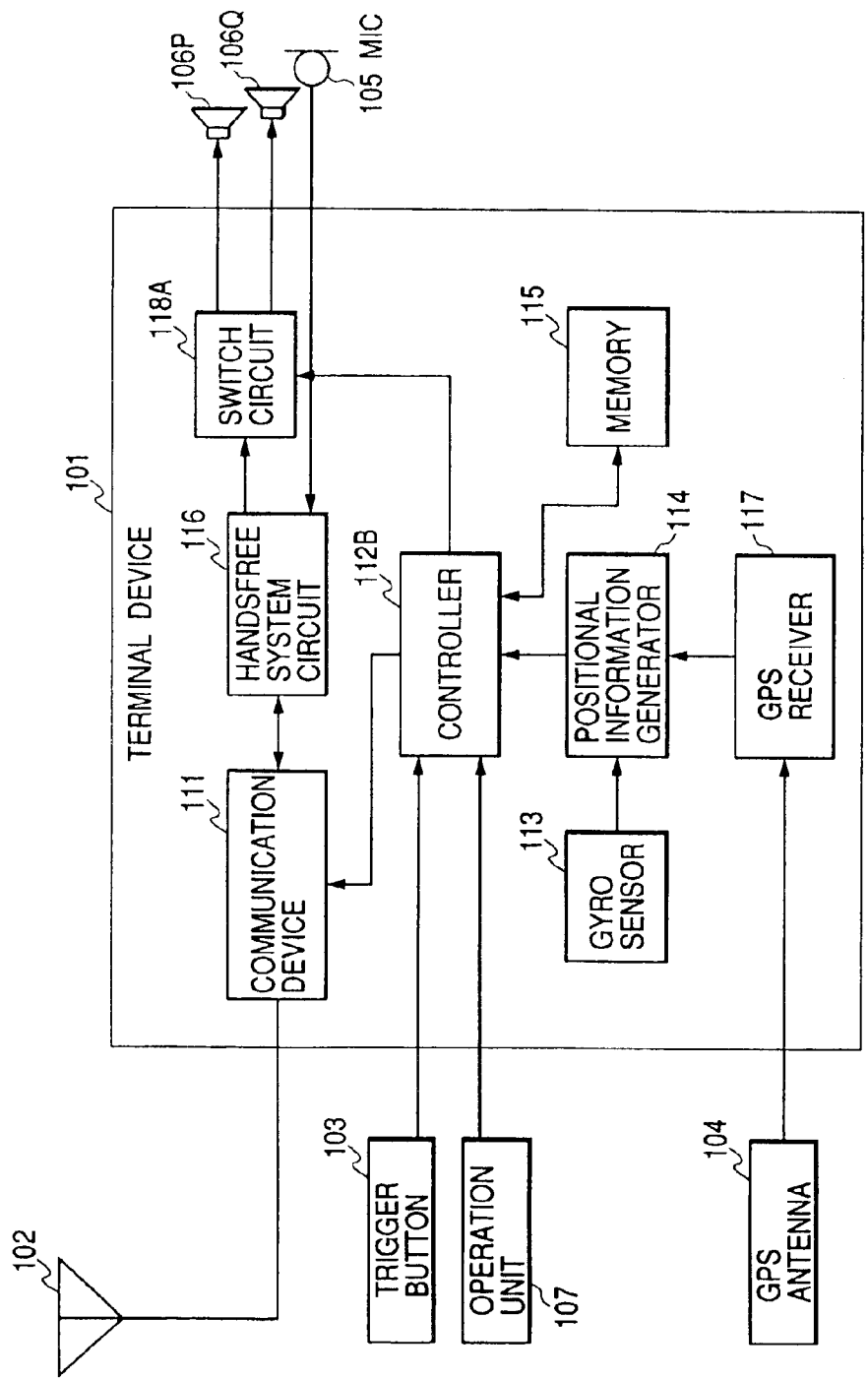
FIG. 12 is a block diagram of an emergency reporting apparatus according to a fifteenth embodiment of this invention.

FIG. 12 shows an emergency reporting apparatus (a terminal apparatus) according to a fifteenth embodiment of this invention. The emergency reporting apparatus in FIG. 12 is similar to that in FIG. 10 except for design changes mentioned hereinafter. The emergency reporting apparatus in FIG. 12 includes controller 112B and a switch circuit 118A which replace the controller 112 and the switch circuit 118 (see FIG. 10) respectively. The controller 112B is connected to the switch circuit 118A. The switch circuit 118A can be controlled by the controller 112B. The emergency reporting apparatus in FIG. 12 also includes an operation unit 107 which can be accessed by a user. The operation unit 107 is connected to the controller 112B.

The operation unit 107 outputs a loudspeaker change requirement signal to the controller 112B when being operated. The operation unit 107 may include a manually-operated switch.

In the case where currently-used one of loudspeakers 106P and 106g becomes damaged or out of order, the operation unit 107 is actuated by the user so that a loudspeaker change requirement signal is fed to the controller 112B. The controller 112B controls the switch circuit 118A in response to the loudspeaker change requirement signal to select the other loudspeaker (that is, the normal loudspeaker). Thus, in this case, the switch circuit 118A transmits an audio signal from a handsfree system circuit 116 to the normal loudspeaker so that the user can hear operator's voice reproduced from the normal loudspeaker.

Sixteenth Embodiment

A sixteenth embodiment of this invention is similar to the fifteenth embodiment thereof (see FIG. 12) except for design changes mentioned hereinafter. In the sixteenth embodiment of this invention, an emergency report receiving center (or a police station) can transmit a DTMF (dual tone multi-frequency) control signal to a communication device 111. The DTMF control signal contains a loudspeaker change requirement signal. The communication device 111 includes a DTMF receiver which recovers the DTMF control signal. The communication device 111 extracts the loudspeaker change requirement signal from the recovered DTMF control signal.

In the case where currently-used one of loudspeakers 106P and 106Q becomes damaged or out of order, the emergency report receiving center (or the police station) transmits a DTMF control signal to the communication device 111. The DTMF control signal contains a loudspeaker change requirement signal. The communication device 111 extracts the loudspeaker change requirement signal from the DTMF control signal. The communication device 111 outputs the loudspeaker change requirement signal to a controller 112B. The controller 112B controls a switch circuit 118A in response to the loudspeaker change requirement signal to select the other loudspeaker (that is, the normal loudspeaker). Thus, in this case, the switch circuit 118A transmits an audio signal from a handsfree system circuit 116 to the normal loudspeaker so that the user can hear operator's voice reproduced from the normal loudspeaker.

Seventeenth Embodiment

A seventeenth embodiment of this invention is similar to the fifteenth embodiment thereof (see FIG. 12) except for the following design change. According to the seventeenth embodiment of this invention, a switch circuit 118A changes a currently-used loudspeaker from an audio-system loudspeaker 106a located in a right front door D1 to an audio-system loudspeaker 106c located in a left front door D3 (see FIG. 9) in response to a loudspeaker change requirement signal outputted by a controller 112B.

Eighteenth Embodiment

An eighteenth embodiment of this invention is similar to the fifteenth embodiment thereof (see FIG. 12) except for the following design change. According to the eighteenth embodiment of this invention, a switch circuit 118A changes a currently-used loudspeaker from an audio-system loudspeaker 106c located in a left front door D3 to an audio-system loudspeaker 106a located in a right front door D1 (see FIG. 9) in response to a loudspeaker change requirement fed via a controller 112B.

Nineteenth Embodiment

A nineteenth embodiment of this invention is similar to the fifteenth embodiment thereof (see FIG. 12) except for the following design change. According to the nineteenth embodiment of this invention, a switch circuit 118A changes a currently-used loudspeaker from an audio-system loudspeaker 106d located in a left rear door D4 to an audio-system loudspeaker 106b located in a right rear door D2 (see FIG. 9) in response to a loudspeaker change requirement fed via a controller 112B.

Twentieth Embodiment

A twentieth embodiment of this invention is similar to the fifteenth embodiment thereof (see FIG. 12) except for the following design change. According to the twentieth embodiment of this invention, a switch circuit 118A changes a currently-used loudspeaker from an audio-system loudspeaker 106b located in a right rear door D2 to an audio-system loudspeaker 106d located in a left rear door D4 (see FIG. 9) in response to a loudspeaker change requirement fed via a controller 112B.

Twenty-First Embodiment

A twenty-first embodiment of this invention is similar to the fifteenth embodiment thereof (see FIG. 12) except for the following design change. According to the twenty-first embodiment of this invention, a switch circuit 118A changes a currently-used loudspeaker from an audio-system loudspeaker 106c located in a left front door D3 to an audio-system loudspeaker 106d located in a left rear door D4 (see FIG. 9) in response to a loudspeaker change requirement fed via a controller 112B.

Twenty-Second Embodiment

A twenty-second embodiment of this invention is similar to the fifteenth embodiment thereof (see FIG. 12) except for the following design change. According to the twenty-second embodiment of this invention, a switch circuit 118A changes a currently-used loudspeaker from an audio-system loudspeaker 106d located in a left rear door D4 to an audio-system loudspeaker 106c located in a left front door D3 (see FIG. 9) in response to a loudspeaker change requirement fed via a controller 112B.

Twenty-Third Embodiment

A twenty-third embodiment of this invention is similar to the fifteenth embodiment thereof (see FIG. 12) except for the following design change. According to the twenty-third embodiment of this invention, a switch circuit 118A changes a currently-used loudspeaker from an audio-system loudspeaker 106a located in a right front door D1 to an audio-system loudspeaker 106b located in a right rear door D2 (see FIG. 9) in response to a loudspeaker change requirement fed via a controller 112B.

Twenty-Fourth Embodiment

A twenty-fourth embodiment of this invention is similar to the fifteenth embodiment thereof (see FIG. 12) except for the following design change. According to the twenty-fourth embodiment of this invention, a switch circuit 118A changes a currently-used loudspeaker from an audio-system loudspeaker 106b located in a right rear door D2 to an audio-system loudspeaker 106a located in a right front door D1 (see FIG. 9) in response to a loudspeaker change requirement fed via a controller 112B.

Twenty-Fifth Embodiment

A twenty-fifth embodiment of this invention is similar to the fifteenth embodiment thereof (see FIG. 12) except for the following design change. According to the twenty-fifth embodiment of this invention, a switch circuit 118A changes a currently-used loudspeaker from an audio-system loudspeaker 106a located in a right front door D1 to an audio-system loudspeaker 106d located in a left rear door D4 (see FIG. 9) in response to a loudspeaker change requirement fed via a controller 112B.

Twenty-Sixth Embodiment

A twenty-sixth embodiment of this invention is similar to the fifteenth embodiment thereof (see FIG. 12) except for the following design change. According to the twenty-sixth embodiment of this invention, a switch circuit 118A changes a currently-used loudspeaker from an audio-system loudspeaker 106d located in a left rear door D4 to an audio-system loudspeaker 106a located in a right front door D1 (see FIG. 9) in response to a loudspeaker change requirement fed via a controller 112B.

Twenty-Seventh Embodiment

A twenty-seventh embodiment of this invention is similar to the fifteenth embodiment thereof (see FIG. 12) except for the following design change. According to the twenty-seventh embodiment of this invention, a switch circuit 118A changes a currently-used loudspeaker from an audio-system loudspeaker 106c located in a left front door D3 to an audio-system loudspeaker 106d located in a left rear door D4 (see FIG. 9) in response to a loudspeaker change requirement fed via a controller 112B.

Twenty-Eighth Embodiment

A twenty-eighth embodiment of this invention is similar to the fifteenth embodiment thereof (see FIG. 12) except for the following design change. According to the twenty-eighth embodiment of this invention, a switch circuit 118A changes a currently-used loudspeaker from an audio-system loudspeaker 106b located in a right rear door D2 to an audio-system loudspeaker 106c located in a left front door D3 (see FIG. 9) in response to a loudspeaker change requirement fed via a controller 112B.

Twenty-Ninth Embodiment

A twenty-ninth embodiment of this invention is similar to the fifteenth embodiment thereof (see FIG. 12) except for the following design changes. The twenty-ninth embodiment of this invention includes sensors for detecting the levels of sounds generated by loudspeakers 106P and 106Q respectively. The sensors are connected to a controller 112B. The sensors output signals to the controller 112B which represent the detected levels of sounds generated by the loudspeakers 106P and 106Q respectively. Thus, the controller 112B is informed of the detected levels of sounds generated by the loudspeakers 106P and 106Q respectively.

The controller 112B compares the detected level of sound generated by each of the loudspeakers 106P and 106Q with a predetermined reference level. When the detected level of sound generated by the loudspeaker 106P is equal to or higher than the reference level, the controller 112B decides that the loudspeaker 106P is normal. Similarly, when the detected level of sound generated by the loudspeaker 106Q is equal to or higher than the reference level, the controller 112B decides that the loudspeaker 106Q is normal. When the detected level of sound generated by the loudspeaker 106P is lower than the reference level, the controller 112B decides that the loudspeaker 106P is wrong. Similarly, when the detected level of sound generated by the loudspeaker 106Q is lower than the reference level, the controller 112B decides that the loudspeaker 106Q is wrong.

In the case where one of the loudspeakers 106P and 106Q is decided to be wrong, the controller 112B controls the switch circuit 118A to select the other loudspeaker (that is, the normal loudspeaker). Thus, in this case, the switch circuit 118A transmits an audio signal from a handsfree system circuit 116 to the normal loudspeaker so that a user can hear operator's voice reproduced from the normal loudspeaker.

Thirtieth Embodiment

A thirtieth embodiment of this invention is similar to the fifteenth embodiment thereof (see FIG. 12) except for the following design changes. The thirtieth embodiment of this invention includes sensors for detecting the impedances (the input impedances) of loudspeakers 106P and 106Q respectively. The sensors are connected to a controller 112B. The sensors output signals to the controller 112B which represent the detected impedances of the loudspeakers 106P and 106Q respectively. Thus, the controller 112B is informed of the detected impedances of the loudspeakers 106P and 106Q respectively.

The controller 112B decides whether or not the detected impedance of each of the loudspeakers 106P and 106Q exists in a predetermined reference range (a predetermined normal-impedance range). When the detected impedance of the loudspeaker 106P exists in the reference range, the controller 112B decides that the loudspeaker 106P is normal. Similarly, when the detected impedance of the loudspeaker 106Q exists in the reference range, the controller 112B decides that the loudspeaker 106Q is normal. When the detected impedance of the loudspeaker 106P exists outside the reference range, the controller 112B decides that the loudspeaker 106P is wrong. Similarly, when the detected impedance of the loudspeaker 106Q exists outside the reference range, the controller 112B decides that the loudspeaker 106Q is wrong.

In the case where one of the loudspeakers 106P and 106Q is decided to be wrong, the controller 112B controls the switch circuit 118A to select the other loudspeaker (that is, the normal loudspeaker). Thus, in this case, the switch circuit 118A transmits an audio signal from a handsfree system circuit 116 to the normal loudspeaker so that a user can hear operator's voice reproduced from the normal loudspeaker.

What is claimed is:

1. In a vehicle including an audio system, a method of reporting an emergency, comprising the steps of:
   allowing handsfree speech communication with an emergency report receiving center via a microphone and a loudspeaker; and
   using a loudspeaker of the audio system as the handsfree speech communication loudspeaker; and
   in cases where the loudspeaker of the audio system is wrong, replacing the loudspeaker of the audio system with another loudspeaker of the audio system and thereby using another loudspeaker of the audio system as the handsfree speech communication loudspeaker;
   wherein the replacing step comprises the step of replacing the loudspeaker of the audio system with another loudspeaker of the audio system in response to a loudspeaker change requirement signal transmitted from the emergency report receiving center.

2. A method as recited in claim 1, wherein a DTMF signal is used as the loudspeaker change requirement signal.

* * * * *